(12) United States Patent
Park et al.

(10) Patent No.: US 11,449,430 B2
(45) Date of Patent: Sep. 20, 2022

(54) KEY-VALUE STORE ARCHITECTURE FOR KEY-VALUE DEVICES

(71) Applicant: SAMSUNG ELECTRONICS CO., LTD., Suwon-si (KR)

(72) Inventors: Heekwon Park, Cupertino, CA (US); Ho bin Lee, San Jose, CA (US); Ilgu Hong, Santa Clara, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/886,552

(22) Filed: May 28, 2020

(65) Prior Publication Data
US 2021/0311877 A1  Oct. 7, 2021

Related U.S. Application Data

(60) Provisional application No. 63/008,549, filed on Apr. 10, 2020, provisional application No. 63/004,321, filed on Apr. 2, 2020.

(51) Int. Cl.
*G06F 12/00* (2006.01)
*G06F 13/00* (2006.01)
*G06F 13/28* (2006.01)
*G06F 12/0871* (2016.01)
*G06F 16/22* (2019.01)
*G06F 12/0862* (2016.01)

(52) U.S. Cl.
CPC ...... *G06F 12/0871* (2013.01); *G06F 12/0862* (2013.01); *G06F 16/2282* (2019.01); *G06F 2212/466* (2013.01); *G06F 2212/6022* (2013.01)

(58) Field of Classification Search
CPC ............ G06F 12/0871; G06F 12/0862; G06F 16/2282; G06F 16/14
USPC ........................................................ 711/118
See application file for complete search history.

(56) References Cited

U.S. PATENT DOCUMENTS

| | | |
|---|---|---|
| 5,963,963 A | 10/1999 | Schmuck et al. |
| 8,504,849 B2 | 8/2013 | Jogand-Coulomb et al. |
| 8,700,683 B2 | 4/2014 | Cooney et al. |
| 9,075,710 B2 | 7/2015 | Talagala et al. |
| 9,396,350 B1 | 7/2016 | Feldman et al. |
| 9,519,647 B2 | 12/2016 | Batwara et al. |
| 10,275,357 B2 | 4/2019 | Choi et al. |

(Continued)

OTHER PUBLICATIONS

Lee, Chang-Gyu, et al., "iLSM-SSD: An Intelligent LSM-tree based Key-Value SSD for Data Analytics," 2019 IEEE 27th International Symposium on Modeling, Analysis, and Simulation of Computer and Telecommunication Systems (MASCOTS), 2019, pp. 384-395.

(Continued)

*Primary Examiner* — Edward J Dudek, Jr.
*Assistant Examiner* — Sidney Li
(74) *Attorney, Agent, or Firm* — Lewis Roca Rothgerber Christie LLP

(57) ABSTRACT

Provided is a method of data storage, the method including receiving a write request including a user key, determining the user key exists in a cache, generating or updating metadata corresponding to the user key, writing data corresponding to the write request to a storage device, converting the metadata to a device format corresponding to the storage device, and storing the metadata on the storage device.

20 Claims, 19 Drawing Sheets

(56) References Cited

U.S. PATENT DOCUMENTS

| | | | |
|---|---|---|---|
| 2011/0276744 A1* | 11/2011 | Sengupta | G06F 12/0246 |
| | | | 711/103 |
| 2013/0042060 A1* | 2/2013 | Marukame | G06F 12/0246 |
| | | | 711/108 |
| 2019/0155959 A1* | 5/2019 | Lee | G06F 3/0638 |

OTHER PUBLICATIONS

Lu, Lanyue et al., "WiscKey: Separating Keys from Values in SSD-Conscious Storage," ACM Transactions on Storage, vol. 13, No. 1, Mar. 2017, 28 pages.

Pitchumani, Rekha, et al., "Hybrid Data Reliability for Emerging Key-Value Storage Devices," 18th USENIX Conference on File and Storage Technologies, Feb. 2020, pp. 309-322.

Wu, Sung-Ming, et al., "KVSSD: Close Integration of LSM Trees and Flash Translation Layer for Write-Efficient KV Store," Design, Automation & Test in Europe Conference & Exhibition, 2018, pp. 563-568.

\* cited by examiner

KEY-VALUE STORE ARCHITECTURE FOR KEY-VALUE DEVICES

CROSS-REFERENCE TO RELATED APPLICATION(S)

This U.S. application claims the benefit of and priority to U.S. Provisional Application Ser. No. 63/004,321, filed on Apr. 2, 2020. This application further claims the benefit of and priority to U.S. Provisional Application No. 63/008,549, filed on Apr. 10, 2020.

FIELD

The present disclosure relates generally to a key-value store architecture, and in particular, to a key-value store architecture for key-value devices.

BACKGROUND

A key-value solid state drive (KVSSD) may provide a key-value (KV) interface at a device level, thereby providing improved performance and simplified storage management. This can, in turn, enable high-performance scaling, the simplification of a conversion process (e.g., data conversion between object data and block data), and the extension of drive capabilities. By incorporating a KV store logic within the firmware of a KVSSD, such KVSSDs are able to respond to direct data requests from an application while reducing involvement of host software. Such KVSSDs may further use SSD hardware that can be augmented by using a Flash Translation Layer (FTL) software for providing processing capabilities.

SUMMARY

Embodiments described herein provide improvements to data storage.

According to some embodiments of the present disclosure, there is provided a method of data storage, the method including receiving a write request including a user key, determining the user key exists in a cache, generating or updating metadata corresponding to the user key, writing data corresponding to the write request to a storage device, converting the metadata to a device format corresponding to the storage device, and storing the metadata on the storage device.

Determining the user key exists in the cache may include determining a metadata table to which the user key belongs exists, and determining the metadata has the user key.

Generating or updating metadata corresponding to the user key may include generating the metadata to replace metadata that is absent from the cache, or updating the metadata that exists in the cache.

Generating the metadata may include sending a prefetch request to prefetch the metadata, and adding the metadata to the cache.

Updating the metadata may include creating the user key, inserting the user key into a key map of a metadata table, and adding key information to the metadata table.

Converting the metadata to the device format corresponding to the storage device may include processing requests on pending request queue and building device format.

The method may further include retrieving a metadata table from the cache, determining the metadata is missing from memory, loading the metadata table from a prefetch buffer or from the storage device, determining the user key is found in a corresponding key map, adding key information to a key list, and submitting the metadata to the storage device.

According to other embodiments of the present disclosure, there is provided a KV store for storing data to a storage device, the KV store being configured to receive a write request including a user key, determine the user key exists in a cache, generate or update metadata corresponding to the user key, write data corresponding to the write request to the storage device, convert the metadata to a device format corresponding to the storage device, and store the metadata on the storage device.

The KV store may be configured to determine the user key exists in the cache by determining a metadata table to which the user key belongs exists, and determining the metadata has the user key.

The KV store may be configured to generate or update the metadata corresponding to the user key by generating the metadata to replace metadata that is absent from the cache, or updating the metadata that exists in the cache.

The KV store may be configured to generate the metadata by sending a prefetch request to prefetch the metadata, and adding the metadata to the cache.

The KV store may be configured to update the metadata by creating the user key, inserting the user key into a key map of a metadata table, and adding key information to the metadata table.

The KV store may be configured to convert the metadata to the device format corresponding to the storage device by processing requests on pending request queue and building device format.

The KV store may be further configured to retrieve a metadata table from the cache, determine the metadata is missing from memory, load the metadata table from a prefetch buffer or from the storage device, determine the user key is found in a corresponding key map, add key information to a key list, and submit the metadata to the storage device.

According to yet other embodiments of the present disclosure, there is provided a non-transitory computer readable medium implemented with a KV store for storing data to a storage device, the non-transitory computer readable medium having computer code that, when executed on a processor, implements a method of data storage, the method including receiving a write request including a user key, determining the user key exists in a cache, generating or updating metadata corresponding to the user key, writing data corresponding to the write request to a storage device, converting the metadata to a device format corresponding to the storage device, and storing the metadata on the storage device.

Determining the user key exists in the cache may include determining a metadata table to which the user key belongs exists, and determining the metadata has the user key.

Generating or updating metadata corresponding to the user key may include generating the metadata to replace metadata that is absent from the cache, or updating the metadata that exists in the cache.

Generating the metadata may include sending a prefetch request to prefetch the metadata, and adding the metadata to the cache.

Updating the metadata may include creating the user key, inserting the user key into a key map of a metadata table, and adding key information to the metadata table.

Converting the metadata to the device format corresponding to the storage device may include processing requests on pending request queue and building device format.

Accordingly, embodiments of the present disclosure improve data storage by providing a high-performance KV store architecture for a KV device capable of advanced functionality, efficient KV management, and write amplification factor (WAF) reduction, while also omitting a conventionally used file system and a conventionally used write-ahead log (WAL).

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1:
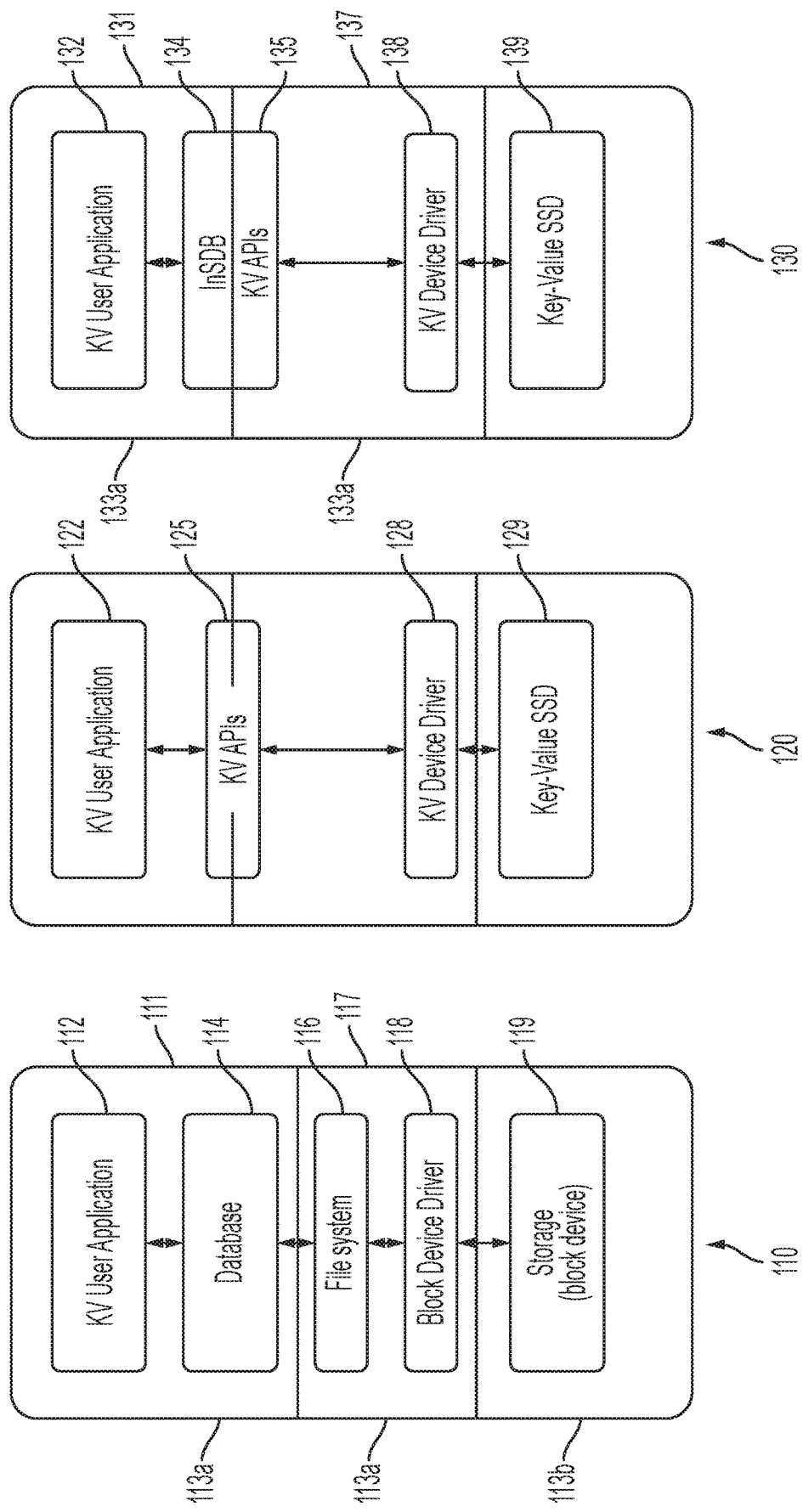
FIG. 1 depicts respective block diagrams of a first key-value (KV) store, of a second KV store using a KV solid state drive, and of a KV store using a KV solid state drive according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Key-value (KV) stores in the art may not support special operations (e.g., range query, iterator/snapshot, prefix extractor, time to live (TTL) operations, column family transactions, etc.). Also, KV stores in the art may use device input/output (I/O) operations for retrieving key information from a storage device (e.g., information indicating key existence, value size check, a number of keys, etc.).

Some embodiments of the present disclosure, however, provide a high-performance KV store architecture for a KV device (e.g., a key-value solid state drive (KVSSD)) capable of advanced functionality, efficient KV management, and write amplification factor (WAF) reduction, while omitting a file system, thereby omitting any need for KV-to-file translation, while also omitting a WAL that is conventionally used for crash recovery. Accordingly, the disclosed embodiments provide an improved KV store architecture, thereby improving KVSSD technology.

As will be described below, some embodiments of the present disclosure provide a KV store architecture for supporting KV store operators (e.g., put, get, delete, iterator, etc.) used in association with a KVSSD while providing a WAL-less mechanism for using a data path for read, write, and delete operations. Further, instead of using a file system, some embodiments of the present disclosure use a metadata buffer for storage management that may efficiently support key iterator operations by involving multiple buffer writes in the data path. Additionally, instead of a write path involving two disk writes including WAL and data, a write path of some of the embodiments may involve only a single disk write.

Moreover, the KV store of some of the embodiments may run on a KVSSD, and may support all of special database (DB) operations for existing databases that may be other difficult for KVSSD to provide due to associated overhead. According to some embodiments of the present disclosure, userkey-to-block mapping management may be offloaded to one or more KVSSDs that have computation units for managing the userkey-to-block mapping. However, because a KVSSD may have limited computational resources, the KVSSD might not be able to otherwise provide all special DB operations.

Accordingly, some embodiments may identify "complex" operations (e.g., transaction, iterator, or recovery), and may handle the operations at the host side while KVSSD manages simple key block mapping. Some of the operations of the embodiments that may be compatible with KVSSD technology may correspond to metadata table management, put/delete/get/iterator procedures, transaction management, recovery, and cache management.

FIG. 1 includes respective block diagrams depicting a high-level overview of a first KV store, a second KV store using a KV solid state drive, and a KV store using a KV solid state drive according to some embodiments of the present disclosure.

Referring to FIG. 1, in a first KV store 110, a user application 112 may use a write-ahead log (WAL) 114 for write operations, and may transfer KV pairs between a file system 116 and the user application 112 on the application side 111. Furthermore, system software 117 corresponding to a host 113a may include a file system 116 and a block device driver 118 to enable transfer of data between the user application 112 and a storage device 119 (e.g., a block device or a KV device). The storage device 119 may be on the device side 113b.

In a second KV store 120, which uses a KV device driver 128 for operations with a KVSSD 129, may be limited in that the second KV store 120 cannot support special operations, such as range query, iterator/snapshot, prefix extractor, time to live (TTL) operations, column family transactions, and so on. Also, device I/O operations may be used for getting key information (e.g., for retrieving information indicating key existence, value size check, a number of keys, etc. from the KVSSD 129).

Unlike the first KV store 110, a KVSSD-based KV store 130 (e.g., a computational-storage-based KV store (CSKVS) discussed in further detail below with respect to FIG. 3) of some embodiments of the present disclosure may omit host-side key management otherwise at the host 133a. Also, the KVSSD-based KV store 130 may omit the WAL 114 and the file system 116 used in the first KV store 110.

Accordingly, the user application 132 is able to transfer data to and from a KV storage 139 (e.g., a KVSSD) via one or more KV application programming interfaces (APIs) 135, which may cause a small or negligible amount of overhead. The KV APIs may be similar to KV APIs 125 of the second KV store 120. The KV APIs 135 may be implemented on the application side 131, or may be implemented as system software 137. The KVSSD-based KV store 130 may use the KV APIs 135 to provide advanced functionality, although some advanced operations might not be supported (e.g., iterator (ordered) operations, range query operations, snapshot operations, transaction operations, large operations, value & key Support, TTL operations, non-existent key filtering in the host, etc.).

The KVSSD-based KV store 130 may also use a KV device driver 138 for driving the KVSSD 139. Accordingly, after a user sends commands via the user application 132, the commands can be translated to device commands. That is, the KVSSD-based KV store 130 of embodiments of the present disclosure may manage KV data, and may translate the KV data from KV format to a file format corresponding to the user application 132. The KVSSD-based KV store 130 may then send the KV data to the KVSSD 139. Accordingly, embodiments of the present disclosure provide improved performance while supporting the KVSSD 139 with KV APIs 135.

An in-storage database (InSDB) 134 of the KVSSD-based KV store 130 may refer to a relatively high-performance, memory space-efficient embedded database for storing KV data. The InSDB 134 according to embodiments of the present disclosure may be a KV database that is compatible with one or more databases in the art, and may provide an improved framework for making efficient use of KVSSD 139 for I/O bound workloads. The InSDB 134 may be stored and executed (e.g., as computer code) on the host side 133a of the KVSSD-based KV store 130, and may include a KV cache while performing key and cache management.

Accordingly, the InSDB 134 can support special operations and features on the host side 133a (e.g., iterator operations, range query operations, snapshot operations, comparator operations, transaction operations, TTL operations, key exist determination operations, column family, data compression, cyclic redundancy checks (CRC), etc.). Further, the InSDB 134 allows the user application 132 to create a request (e.g., put, get, del, etc.) to communicate with the KVSSD 139, and the KVSSD 139 is able to store KV pairs, and support basic KV operations created by the user application 132.

The key management operations by the InSDB 134 may manage valid keys in host memory. The InSDB 134 of some of the disclosed embodiments reduces KV management overhead (e.g., get value size operations, key exist operations, number of keys, free space management, etc.). The InSDB 134 may also support special operations with relatively low overhead (e.g., range query operations, iterator/ snapshot, prefix extractor, TTL, column family, etc.). Key management by the InSDB may also support transactions without device support. Some of the features of key management may include obviating the need to hold keys in the memory by keeping hot keys, reducing or minimizing overwriting of key tables by separating key ranges into multiple key tables, using limited key table size, and updating occasionally changed key tables. These features may be performed in the background to reduce or minimize impact on application performance.

Figure 2A:
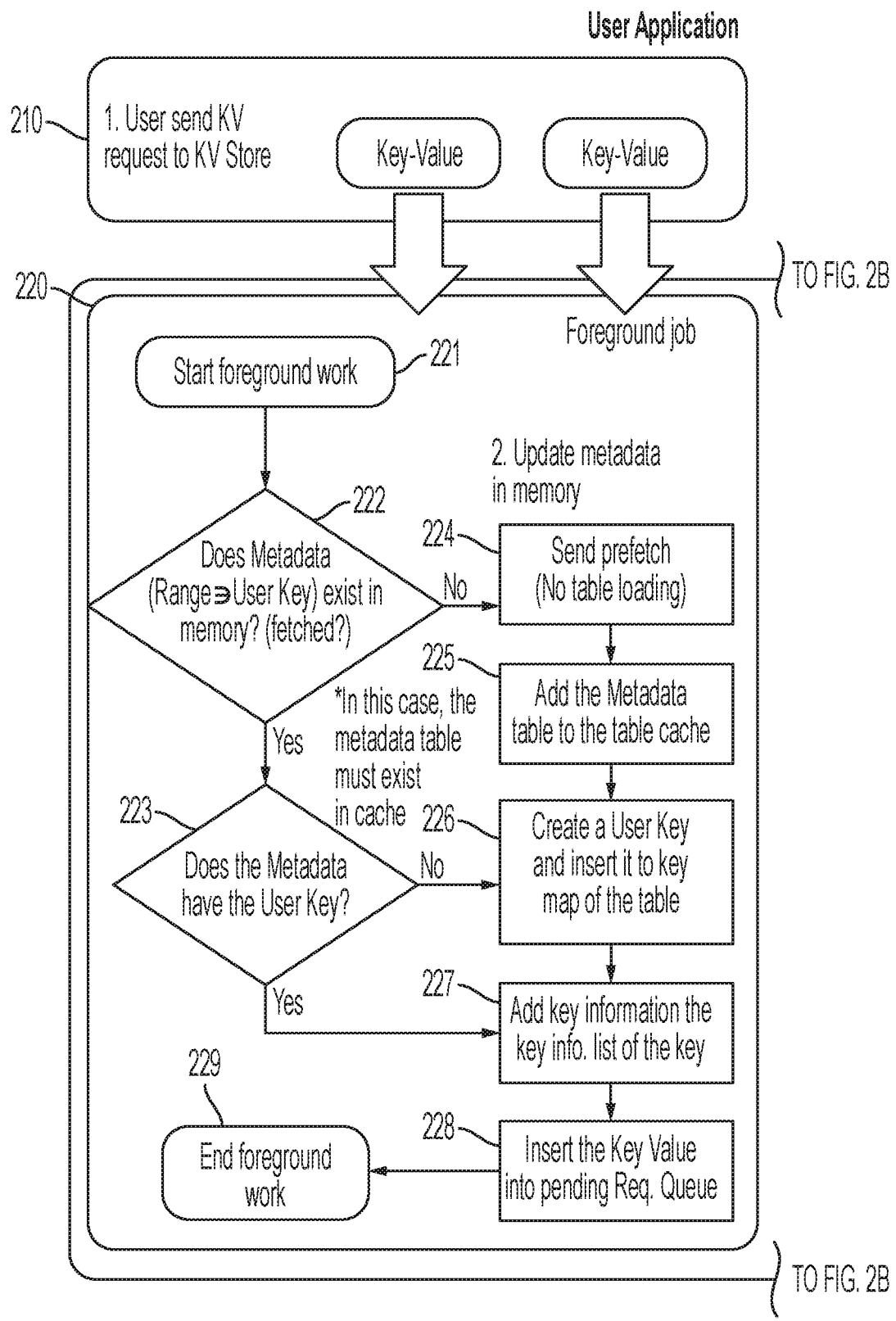
FIGS. 2A and 2B are a flow chart depicting a method of data storage according to some embodiments of the present disclosure.
Figure 2B:
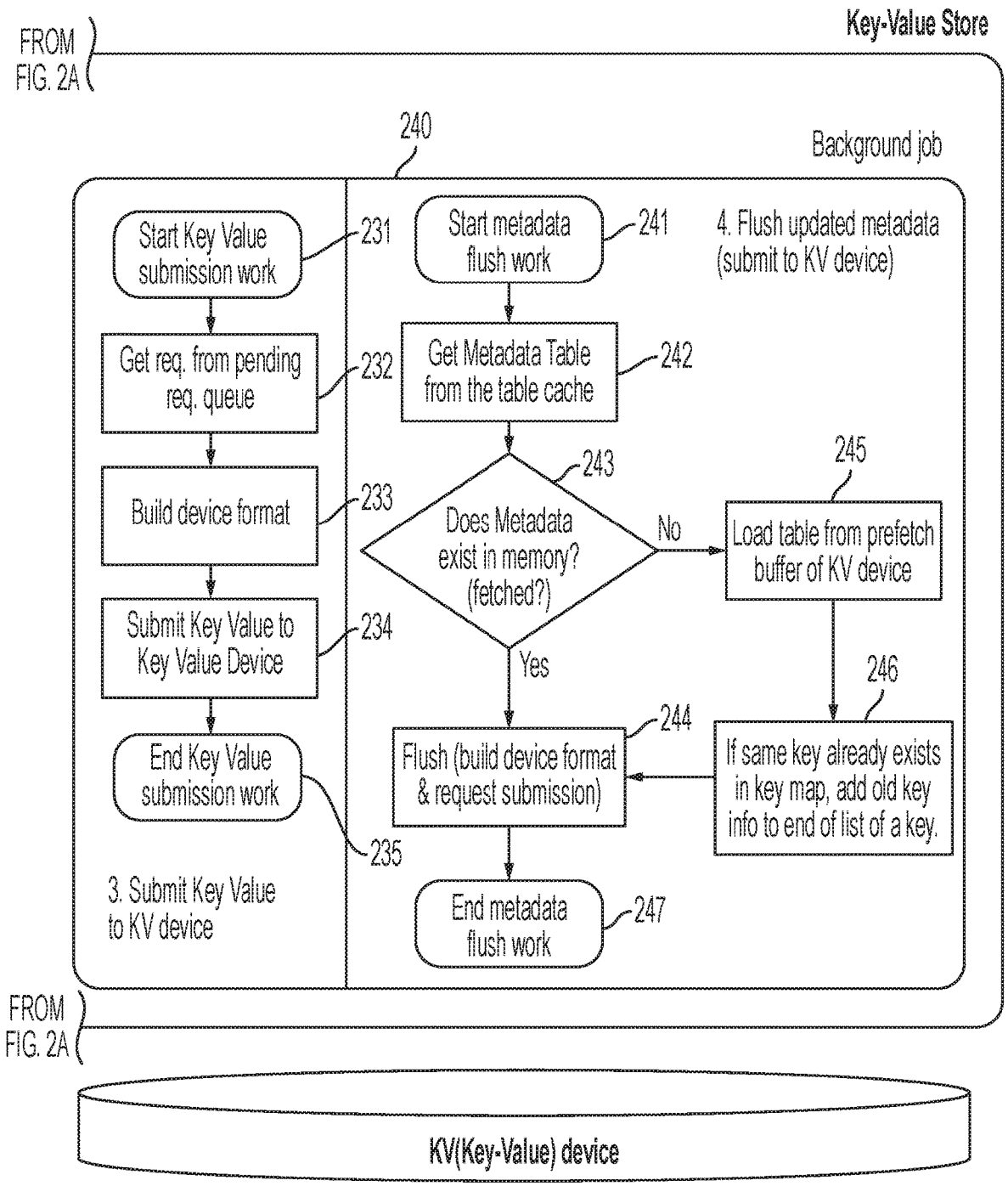

FIGS. 2A and 2B are a flow chart depicting a method of data storage according to some embodiments of the present disclosure.

Referring to FIGS. 2A and 2B, a KV store according to some embodiments of the present disclosure may operate as follows. As a first operation, at 210, a user application according to embodiments of the present disclosure (e.g., the user application 132 of FIG. 1) may submit a KV request (e.g., a put/write request) with a user key. That is, a user can send a KV request to a KV store (e.g., the KVSSD-based KV store 130 of FIG. 1 or the computational-storage-based KV store (CSKVS) 330 of FIG. 3).

As a second operation, at 220, the KV store according to embodiments of the present disclosure may perform foreground work. For example, at 221, the KV store may begin the foreground work. Then, the KV store may check to determine whether the user key exists in the memory (e.g., whether the user key of the put/write request exists in the cache). This may be achieved by determining at 222 whether a corresponding metadata table (to which the user key belongs) exists, and then determining at 223 whether the metadata actually includes the user key.

However, metadata corresponding to the user key might not exist in the cache, in which case, the metadata may be prefetched from a device for that key in background operations. That is, if the metadata corresponding to the user key is not located in the cache, a dummy (or empty) metadata table may be inserted to cache, and may be filled when the actual metadata is ready in memory. This may be achieved before creating a user key. After creating a user key, the dummy metadata table may be inserted into a key map of the metadata table.

For example, if it is determined at 222 that the metadata does not exist in memory, at 224, the system may send a prefetch request to prefetch the metadata. Then, at 225, the system may add the metadata table to the table cache.

At 226, the system may create a user key, and may insert the user key into a key map of the metadata table. This may occur also if it is determined, at 223, that the metadata does not have the user key, even if it was determined at 222 that the metadata does exist in memory, as the metadata table exists somewhere in the cache.

Thereafter (or contrastingly, if it is determined at 222 that the metadata is located in memory, and it is also determined at 223 that the given user key already exists in the metadata), at 227, the key information and the list of the key may be added, and at 228, the key value may be inserted into a pending request queue. Accordingly, the value may be added to end of the value list of the user key, and the system may end the foreground work at 229.

As a third operation, at 230, regardless of whether the metadata is prefetched or found and then updated, the data corresponding to the put/write request may be written to the device in the background. That is, the user key value may be written to the device in a chunk. If a threshold amount is reached, everything may be written to the device. This may be achieved by processing requests on pending request queue. Then, the metadata may be converted to correspond to the device format, and then stored on the KV device (e.g., the KVSSD 139 of FIG. 1). That is, the system may build the device format, and may submit the key value to the KV device. It should be noted that a write thread is described in further detail with respect to FIG. 18 below.

For example, at 231, the KV store may begin KV submission work. At 232, the KV store may retrieve a get request from a pending request queue. Then, at 233, the KV store may build a device format. At 234, the KV store may submit the KV to the KV device. Then, at 235, the KV store may end KV submission work.

As a fourth operation, at 240, the metadata table may be flushed (e.g., submitted to the KV device, such as the KVSSD 139). That is, the old values of the metadata may be deleted during background operations. It should be noted that a SKTable flush thread is described in further detail with respect to FIG. 18 below.

For example, at 241, the KV store may begin metadata flush work. At 242, the metadata table may be retrieved from the table cache. At 243, it may be determined whether the metadata exists in memory. If it is determined that the metadata exists in the memory, the metadata may be flushed at 244. Contrastingly, if the metadata is not found in the memory at 243, then, at 245, the metadata table may be loaded from a prefetch buffer or from the KV device. Then, at 246, if the same key is found in the key map, the old key information may be added to the end of the list of a key, and then the metadata may be flushed at 244. Then the KV store may end the metadata flush work at 247.

Figure 3:
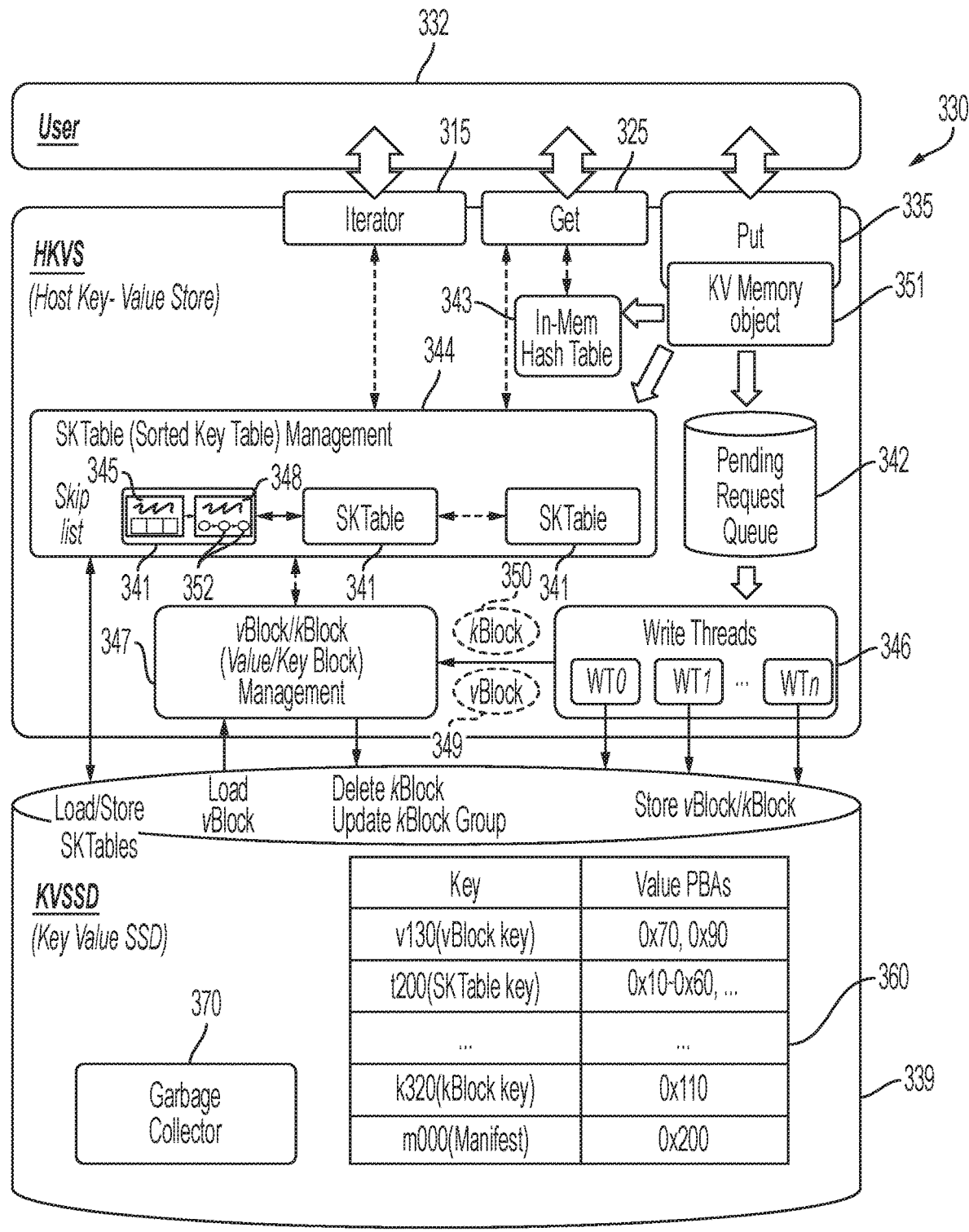
FIG. 3 is a block diagram depicting a computational-storage-based KV store (CSKVS) according to some embodiments of the present disclosure.

FIG. 3 is a block diagram depicting a computational-storage-based KV store (CSKVS) according to some embodiments of the present disclosure.

Referring to FIG. 3, some embodiments of the present disclosure provide a CSKVS 330 that enables offloading of KV functionalities to the storage device (e.g., offloaded to a KVSSD 339), that reduces communication overhead between host and device (e.g., between a host KV store (HKVS) 340 and a KVSSD 339), and that simplifies storage software stack in addition to other advantages.

The CSKVS 330 may include an HKVS 340 and a KVSSD 339. The CSKVS 330 may correspond to the KVSSD-based KV store 130 of FIG. 1. Further, the KVSSD 339 may correspond to the KVSSD 139 of FIG. 1. Additionally, the HKVS 340 may correspond to the InSDB 134 and the KV APIs 135 of FIG. 1.

The HKVS 340 may manage user keys 352 to support "complex" operations (e.g., iterator operations, transaction operations, column family operations, etc.). The KVSSD 339 may manage a KV hash table 360, and may include a "garbage collector" 370 for performing garbage collection operations (e.g., for identifying unusable data, invalid data, or data of low usefulness for eviction or deletion from the KVSSD 139).

User keys 352 in the HKVS 340 may be categorized by one or more respective corresponding user key ranges to which the user keys 352 belong, and each user key range may be managed by a sorted key table (SKTable) manager 344. The HKVS 340 may load a SKTable 341 when a user application 332 (e.g., the user application 132 of FIG. 1) accesses a user key 352 that belongs to the SKTable 341. The HKVS 340 may prefetch the SKTable 341 according to a prefetch policy. To determine which SKTable 341 is to be prefetched and loaded, the HKVS 340 may keep information corresponding to the user key range and each key 352 of the SKTables 341. The information kept by the HKVS 340 may be stored in a manifest (the manifest being described in further detail with respect to FIG. 15 below).

The HKVS 340 may provide various application programming interfaces (APIs) (e.g., Put, Get, and Iterator APIs 315, 325, and 335). The APIs 315, 325, and 335 may correspond to the KV APIs 135 of FIG. 1. A Put API 335 may support, for example, store, delete, and update operations, and may internally create a KV memory object (KVMO) 351 (e.g., a temporary in-memory object), and may insert the KVMO 351 into three data structures (e.g., into a pending request queue (PRQ) 342, an in memory hash table or in memory global hash (e.g., in-memory hash table) 343, and a key queue of unsorted keys 352 (e.g., KeyQueue) 345 that exists per the SKTable 341).

A first data structure may be the PRQ 342. The PRQ 342 may deliver KVMOs 351 to write threads 346. Each of the write threads 346 (e.g., write threads WT0, WT1, . . . , WTn) may retrieve the KVMOs 351 from the PRQ 342, and may create value block (vBlock 349) and key block (kBlock 350) management 347 to submit a corresponding request to the KVSSD 339.

A second data structure may be the in-memory hash table 343, which may have KVMOs 351 that have not yet been inserted into a key map (e.g., keymap) 348 in a SKTable 341. When a key 352 exists in the in-memory hash table 343, the HKVS 340 may serve the key 352 from a corresponding hash. Keys inserted in the keymap 348 of the SKTable 341 may be removed from the in-memory hash table 343.

A third data structure may be the KeyQueue 345 of the SKTable 341. That is, the SKTable 341 may include the KeyQueue 345 with unsorted keys 352, and the keymap 348 with sorted keys 352. The KeyQueue 345 may be used to hold keys 352 before inserting the keys 352 into the keymap 348. Keys in the KeyQueue 345 may be inserted into the keymap 348 through a flush thread or through an iterator operation. The keymap 348 and the KeyQueue 345 are discussed further below.

The Get API 325 may support value retrieval operations. The Get API 325 may check whether the key 352 exists in the in-memory hash table 343, and if so, reads the value from the hash and then serves the value. Otherwise, the Get API 325 may find the key 352 in the keymap 348 of the SKTable 341. When the keymap 348 has not been fetched, the keymap 348 may be read from the KVSSD 339.

The keymap 348 may have an internal key (iKey) of the vBlock 349, and may have an offset index for the key 352. When the key 352 exists in the keymap 348, the HKVS 340 may look up the vBlock 349 in the cache using the iKey. When vBlock 349 does not exist in the cache, the vBlock 349 may be read from the KVSSD 339. After that, the value corresponding to the user key 352 may be found in vBlock 349 using the offset index in the keymap 348.

The Iterator API 315 supports "seek," "previous," "next," and "value" operations. To this end, SKTables 341 may be sorted based on a beginning key (e.g., a begin key or recovery begin iKey), and the keys 352 in each SKTable 341 also may be managed in sorted form. Accordingly, the Iterator API 315 may find the SKTable 341 containing the given key 352, and then may find the key 352 in the keymap 348. When the key 352 belonging to the Iterator API 315 is in the KeyQueue 345, the Iterator API 315 may insert the keys 352 in the KeyQueue 345 into the keymap 348 before accessing the keymap 348. The Iterator API 315 may prefetch next vBlocks 349 when the vBlocks 349 are not fetched yet. The Iterator API 315 may send a prefetch request to a device driver (e.g., the KV device driver 138 of FIG. 1) for driving the KVSSD 339, and the device driver may perform a readahead operation to readahead the requested vBlock 349, and may keep the vBlock 349 in the readahead buffer in the device driver.

Unlike the KVSSD 129 of the second KV store 120, The KVSSD 339 according to some embodiments of the present disclosure may receive a KV pair directly from the host (e.g., directly from the HKVS 340). In the KVSSD 339, keys 352 may be managed based on a KV hash table 360, and the user application 332 may read a user value through a respective key 352. However, in some embodiments, one KV pair may be written atomically. That is, overhead for ensuring data consistency may be reduced or minimized by atomically writing values and keys 352.

The user value may contain the vBlock 349. Accordingly, when some values are not valid, a garbage collection operation may be performed. However, data transfer between host and device may be involved when garbage collection runs on the host. Therefore, garbage collection may be performed on the device (e.g., may be performed by the garbage collector 370 of the KVSSD 339). The vBlock 349 for performing garbage collection may be selected on the HKVS 340, and requested to the KVSSD 339.

Figure 4:
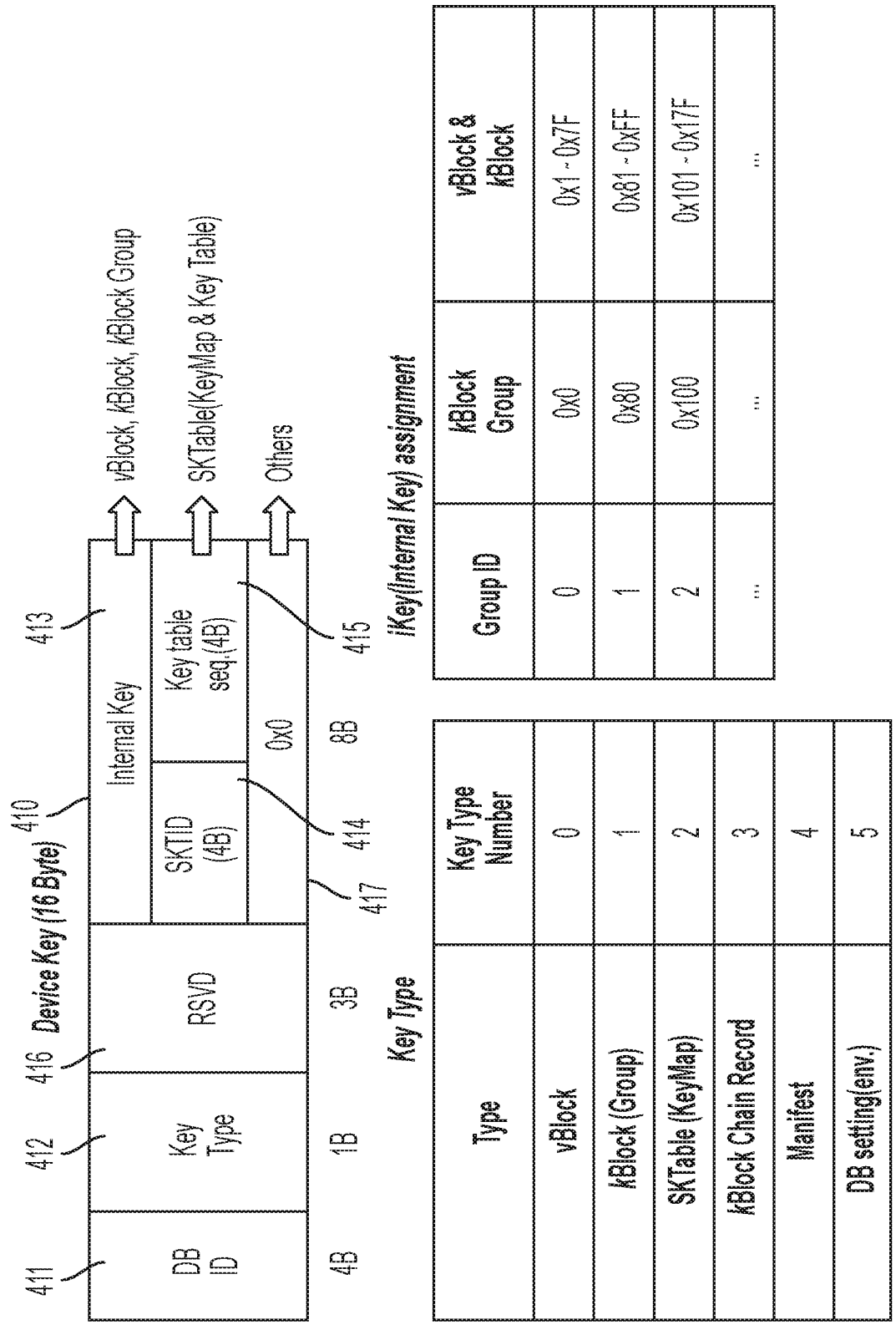
FIG. 4 is a block diagram depicting a device key format according to some embodiments of the present disclosure.

FIG. 4 is a block diagram depicting a device key format according to some embodiments of the present disclosure.

Referring to FIG. 4, the device key 410 may include sixteen bytes. The upper four bytes of the device key 410 may indicate the database identification (DB ID) 411, which may be a 4-byte hash value of the database name. The next single byte of the device key 410 may indicate the key type 412.

The lower eight bytes (e.g., a lower block 417) of the device key 410 may be configured differently according to a respective key type 412. In a vBlock 349 or in a kBlock 350, the lower block 417 of the device key 410 may be filled with the iKey 413. Further, the vBlock 349 and the kBlock 350 may use the same iKey 413. A kBlock group may be created for every 127 kBlocks 350. In embodiments using an SKTable 341, the lower block 417 may include a 4-byte SKTable identifier (SKTID) 414, and also may include four bytes of key table sequence numbers 415. The remaining three bytes of the device key 410 may be reserved (RSVD) 416.

Figure 5:
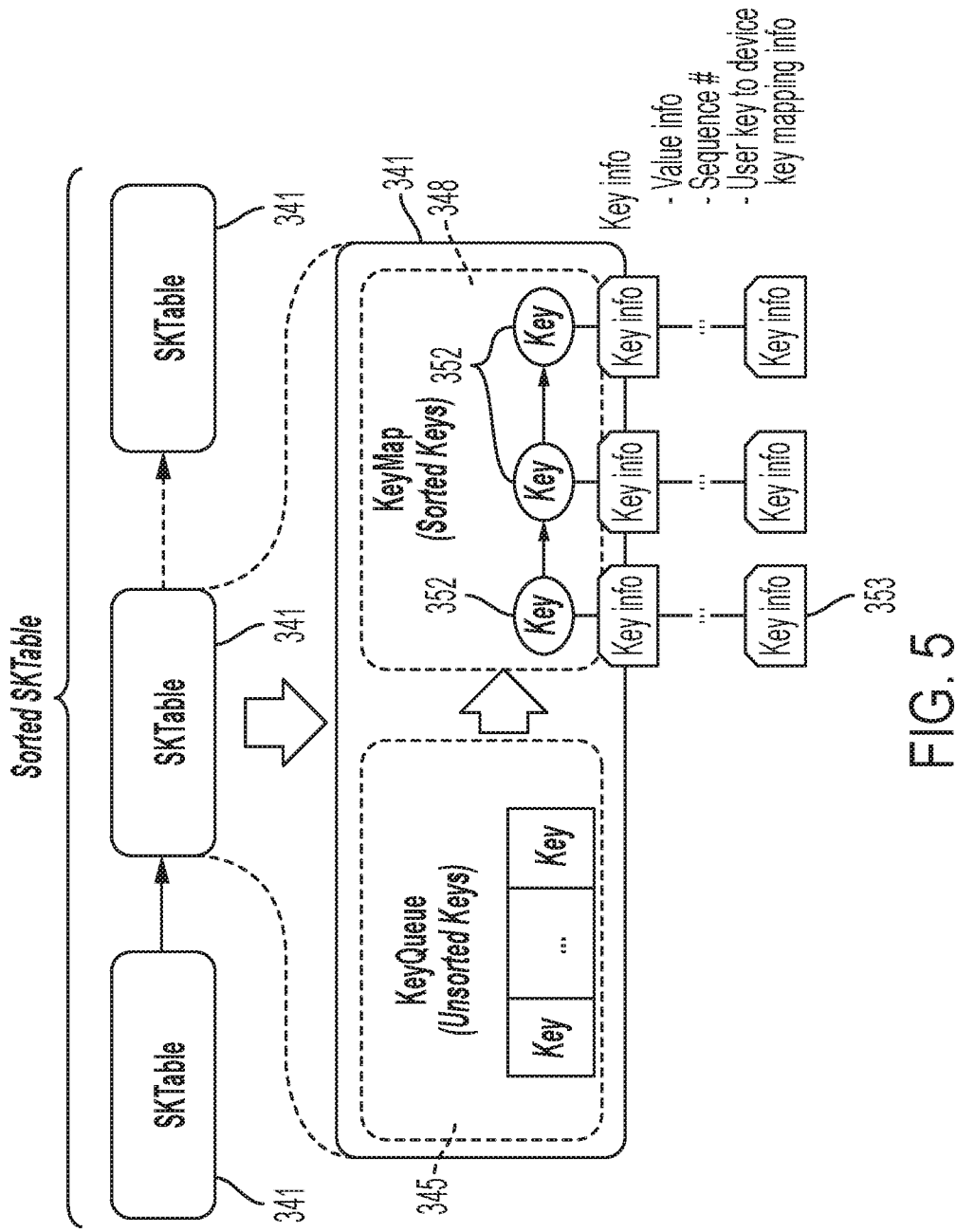
FIG. 5 is a block diagram depicting a sorted key table format according to some embodiments of the present disclosure.

FIG. 5 is a block diagram depicting a sorted key table format according to some embodiments of the present disclosure.

Referring to FIG. 5, KV stores (e.g., the CSKVS 330 of FIG. 3) may support a variety of commands that may be grouped as being either "simple" commands or "complex" commands. A factor that may be used to determine whether a command is labeled as simple or complex may be whether the command has relatively high utilization of hardware resources. For example, a key sorting command may be considered a complex command with high hardware utilization, as a key sorting operation is both high in CPU utilization, and also high in memory utilization. As discussed herein, put, del, and get commands may be categorized as simple commands, and iterator (range scan), transaction, and snapshot commands may be categorized as complex commands.

With respect to put and/or get commands in some KV stores, a KV pair may be translated to a file format, and may be then written to or read from the storage through a file system (as used herein storage refers to computational storage, wherein computations are supported with the storage device, such as the KVSSD 339 of the CSKVS 330 of FIG. 3). Contrastingly, an iterator command may use its own context, which may include sequence number, current position, etc., to execute the iterator command.

Another example is a transaction command (e.g., a write batch transaction), which also may use a relatively large amount of memory resources. Multiple KV pairs may be atomically written to support transactions when using computational storage. However, when there are more than hundreds of thousands of KV pairs in a transaction, it may be relatively burdensome to maintain a log in the storage device for commit and rollback commands/operations, in which changes performed as a result of a transaction command are stored.

Commit and rollback commands may be two transactional statements that are used to respectively perform or undo a transaction. A transaction operation may have a sequence of queries or update statements that may be used for modification of the database. Accordingly, when a transaction operation is successfully executed, then a commit command may enable the corresponding database modification made by the transaction operation to be permanent. Contrastingly, the rollback command may undo all of the updates from the first statement of the transaction when the transaction operation fails to execute successfully.

According to some embodiments of the present disclosure, all of the above commands may be performed in storage (e.g., in the KVSSD 339 of the CSKVS 330 of FIG. 3). However, issues may arise in supporting complex commands in storage. For example, there may be overhead in maintaining sorted data structures, such as trees and skiplist, or such as the keymap 348 of the SKTable 341. Further, there may be direct overhead, computational overhead, and overhead associated with maintenance of the data structure.

A user application (e.g., the user application 332 of FIG. 3) may provide its own comparator for performing sorting operations, and the respective values may be sorted by the comparator. To find a key 352 in a sorted data structure (e.g., the keymap 348), one or more intermediate keys may be loaded and compared by the comparator. Therefore, insertion, deletion, and search operations may use a relatively high amount of CPU and memory resources.

Further, an execution time for completing operations in the computational storage (e.g., the KVSSD 339) may take longer than a corresponding execution time on host systems, because the storage may adopt embedded processors that are generally less powerful than host processors of host systems (e.g., of the HKVS 340 of FIG. 3), and that generally have less memory than the host systems.

Other issues may be associated with indirect overhead, delays caused by "atomic" execution, etc. Even if computational capability within the storage device is similar to that of the host system, interactions between the host and the storage device (e.g., between the HKVS 340 and the KVSSD 339) may cause a relatively significant bottleneck. For example, when a sorted data structure (e.g., SKTable 341) is only kept in the storage, all iterator commands (e.g., next, prey, and seek commands) may be submitted to the device. This may result in non-negligible submission overhead, and a user process may be blocked until the device sends a completion interrupt.

An iterator command may be determined to be a complex command. Each iterator may have its own context, which may include sequence number, current position, etc. The current position may be moved forward or backward in the sorted data structure (e.g., in the keymap 348 of FIG. 5). When a user performs a next command or a previous command on an iterator, the next key or previous key may be found in the sorted data structure. When the key 352 is found, the sequence number and the time may be compared to determine whether the key belongs to the iterator. When the key 352 does not belong to the iterator, searching for another key 352 may continue until a located key 352 satisfies the conditions.

Accordingly, some embodiments of the present disclosure may support only simple commands in the KVSSD 339 of the CSKVS 330, which may effectively limit the use of computational storage. However, complex commands may be efficiently handled by making efficient use of the underlying storage. For example, some complex commands may be supported by managing user keys 352, and a key table (e.g., the SKTable 341) may be used for this purpose.

Each SKTable 341 may manage keys 352 in a respective key range (e.g., the CSKVS may have multiple SKTables 341 for respectively managing keys 352 in a corresponding key range). An entire key range may be divided into multiple SKTables 341, because the host system (e.g., the HKVS 340) may be unable to keep all of the keys 352 in the host memory. Each key node 353 in the SKTable 341 may have key properties (e.g., column, sequence number, creation time, etc.). In the CSKVS 330 according to some embodiments of the present disclosure, the entire key range may be divided such that multiple SKTables 341 may be maintained, with only a subset of the SKTables 341 being in memory, thereby making more efficient use of the memory of the host system.

Accordingly, the CSKVS 330 may have multiple SKTables 341, and some commands may be offloaded to the KVSSD 339 (e.g., get, put, del, and existence commands) while some commands may be provided on the HKVS 340 (e.g., iterator (range scan), transaction, and snapshot commands, as well as other optional operations such as Time-To-Live (TTL)). That is, many operations that may be supported by the host system may be achieved by managing user keys 352 using the SKTable 341.

Figure 6:
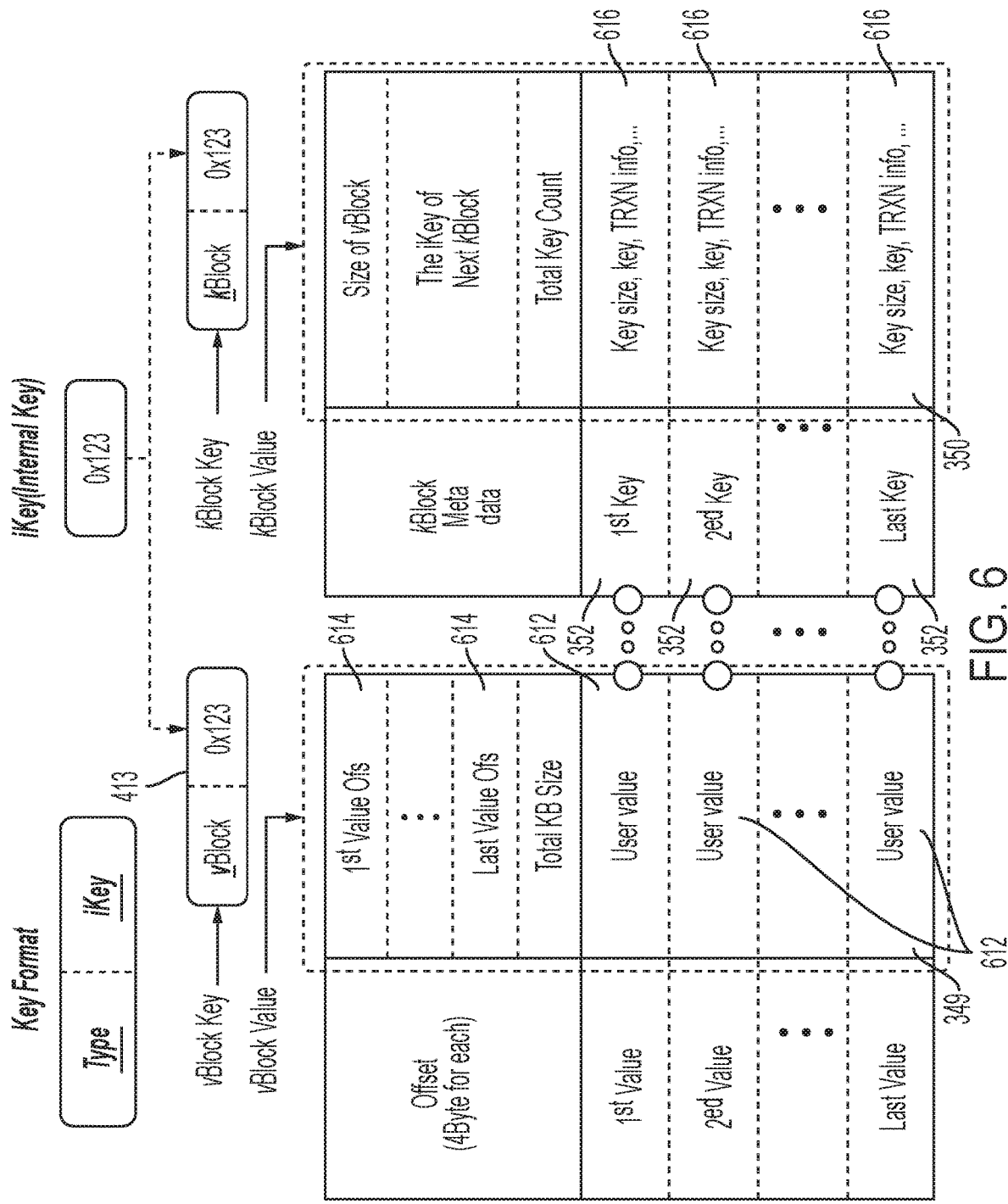
FIG. 6 is a block diagram depicting a vBlock format and a kBlock format according to some embodiments of the present disclosure.

FIG. 6 is a block diagram depicting a vBlock format and a kBlock format according to some embodiments of the present disclosure.

Referring to FIG. 6, some embodiments of the present disclosure may reduce interaction between host and storage (e.g., between the HKVS 340 and the KVSSD 339 of the CSKVS 330 in FIG. 3). For example, interaction with the KVSSD 339 may be reduced by using key management (e.g., the SKTable manager 344 of FIG. 3).

As described above, some commands may be processed by the HKVS 340 to avoid interaction with the KVSSD 339. For example, the HKVS 340 may check whether a key exists before submitting the command to the KVSSD 339. When keys 352 are not managed on the HKVS 340, all get commands and delete commands may be submitted to the KVSSD 339 even when the key does not exist on the system. Operations associated with exist commands and TTL commands might not involve interaction with the KVSSD 339 when keys 352 and attributes are managed by the HKVS 340. Additionally, an operation associated with determining a key count or size within a specific key range might not involve device interaction when the keys 352 are sorted and managed by the HKVS 340, as the HKVS 340 might not need to submit the command to the KVSSD 339.

Some KV stores (e.g., the HKVS 340) may merge KV pairs to reduce the number of I/O operations. For example, some KV stores may use a "memtable" (e.g., the in-memory hash table 343 in FIG. 3) to gather the KV pairs in memory. Then, when the size of the memtable exceeds a reference size (e.g., a maximum size), the memtable may be converted to file format and may be written to the device. As a result, multiple KV pairs may be written to the device in a single operation. Computational storage according to some embodiments of the present disclosure may use a similar mechanism to reduce the number of interactions with the KVSSD 339, even though the CSKVS 330 may receive a KV pair from the user application 332 directly.

Therefore, embodiments of the present disclosure provide a vBlock format and a kBlock format for value packing and key packing, respectively. A vBlock 349 includes values 612, and offsets 614 of the values 612.

A key node 353 in the SKTable 341, may have two pieces of information to enable retrieval of a value 612. The first piece of information may be the iKey 413 of the vBlock 349. The iKey 413 may be assigned to the HKVS 340. The second piece of information may be the index of the value offset (e.g., as opposed to the offset directly). Accordingly, the key node 353 need not update when the offset is changed after any garbage collection operations.

The kBlock 350 may include a key 352 and key properties 616 (e.g., TTL, column ID, Transaction information, key size, etc.). When all of the keys 352 in the kBlock 350 are recorded in the corresponding SKTable 341, the kBlock 350 may be deleted. Because the kBlock 350 is separate from the vBlock 349, the kBlock 350 may be deleted without deleting the vBlock 349.

Contrastingly, when a single block is used for both of the keys 352 and the values 612, the single block may be updated when all of the keys 352 are updated in the kBlock 350. The update may involve, for example, reading an entirety of the value 612, and writing back the value 612 to the KVSSD 339. Accordingly, the CSKVS 330 may store the kBlocks 350 in KVSSD 339 to enable a data recovery operation following a crash.

Figure 7:
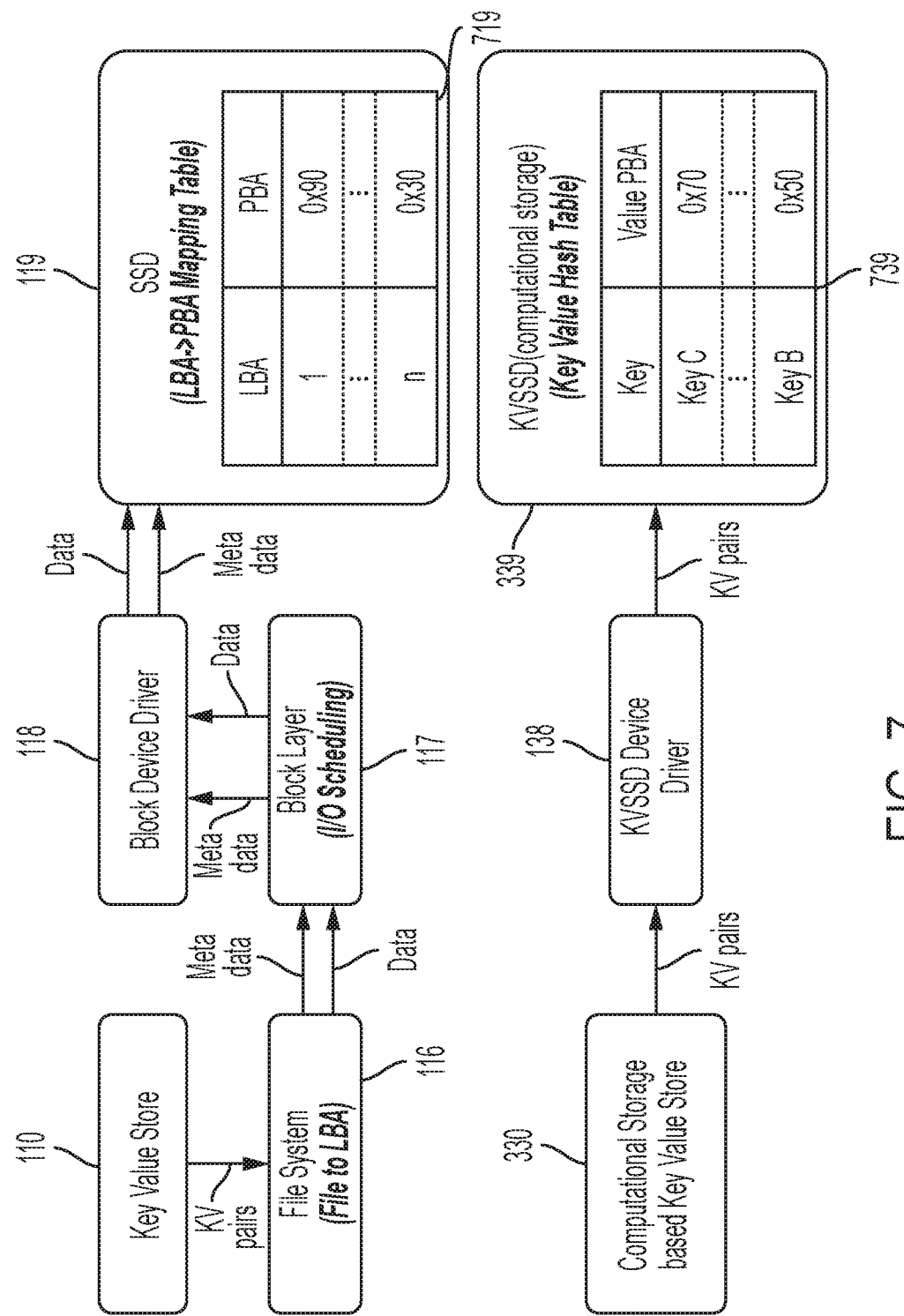
FIG. 7 is a block diagram comparing a KV store to a computational-storage-based KV store according to some embodiments of the present disclosure.

FIG. 7 is a block diagram comparing a KV store (e.g., the first KV store 110 of FIG. 1) to a CSKVS according to some embodiments of the present disclosure.

Referring to FIG. 7, some embodiments of the present disclosure may reduce offload management overhead. For example, the CSKVS 330 may offload garbage collection to the KVSSD 339. The CSKVS 330 may include a vBlock 349 for packing KV pairs. However, some of the KV pairs may be invalidated while others of the KV pairs are still valid. Therefore, when a vBlock 349 has both valid values and invalid values, garbage collection operations may be performed on the vBlock 349 to mark invalid values for eviction. However, garbage collection may use a Read-Modify-Write (RMW) operation.

When the garbage collection operations are performed on the host side, the entire vBlock 349 may be read from the device (e.g., the storage device 119 of FIG. 1, which may be a solid-state drive (SSD)). Then, the vBlock 349 may be modified, and the modified vBlock 349 may be written back to the device, thereby causing extra I/O.

Contrastingly, in the CSKVS 330 system of embodiments of the present disclosure, a garbage collection operation may be performed in the KVSSD 339 without any data transform between the host and the KVSSD 339.

Further, when some of the KV pairs in a vBlock 349 are deleted from the vBlock 349, the offsets of the remaining KV pairs may be changed, thereby warranting a corresponding change in the value location in the SKTable 341. According to some embodiments of the present disclosure, however, update of the SKTable 341 may be avoided by using a collection aware vBlock 349 format (e.g., see FIG. 6).

A key node 353 in the SKTable 341 may have an index of the value offset, instead of having the value offset directly. The number of the indices might not be changed during garbage collection, although the offset of the index may be modified accordingly. Accordingly, the key node 353 in the SKTable 341 need not be updated. In some embodiments, a field-programmable gate array (FPGA) may be utilized to perform garbage collection.

Additionally, the CSKVS 330 also may offload block management. For example, a file system 116 may be one of the key components in a modern computer system. The main role of the file system 116 may be to manage block space, and to maintain mapping between file and block. Therefore, a KV store (e.g., the first KV store 110 of FIG. 1) may convert KV pairs to a file to enable writing the KV pairs to a block device, and may write KV pairs to a file.

Further, the file system 116 may create metadata, such as "inode," for the file. Additionally, the metadata and data that are contents for the file may be written to the storage device 119 via a block layer 717 and a device driver 118. The storage device 119 may have a mapping table 719 for translating logical block addresses (LBAs) to physical block addresses (PBAs).

The CSKVS 330 according to some embodiments of the present disclosure, however, may bypass the file system 116 and the block layer 717 while storing KV pairs. That is, the CSKVS 330 may omit the operation of converting KV pairs to file, and may also omit the operation of translating LBAs to PBAs. Moreover, the CSKVS 330 may avoid creating metadata in the file system level 116. Instead of the translation, the CSKVS 330 may include a hash table 739 for managing key and value PBA mapping.

Figure 8:
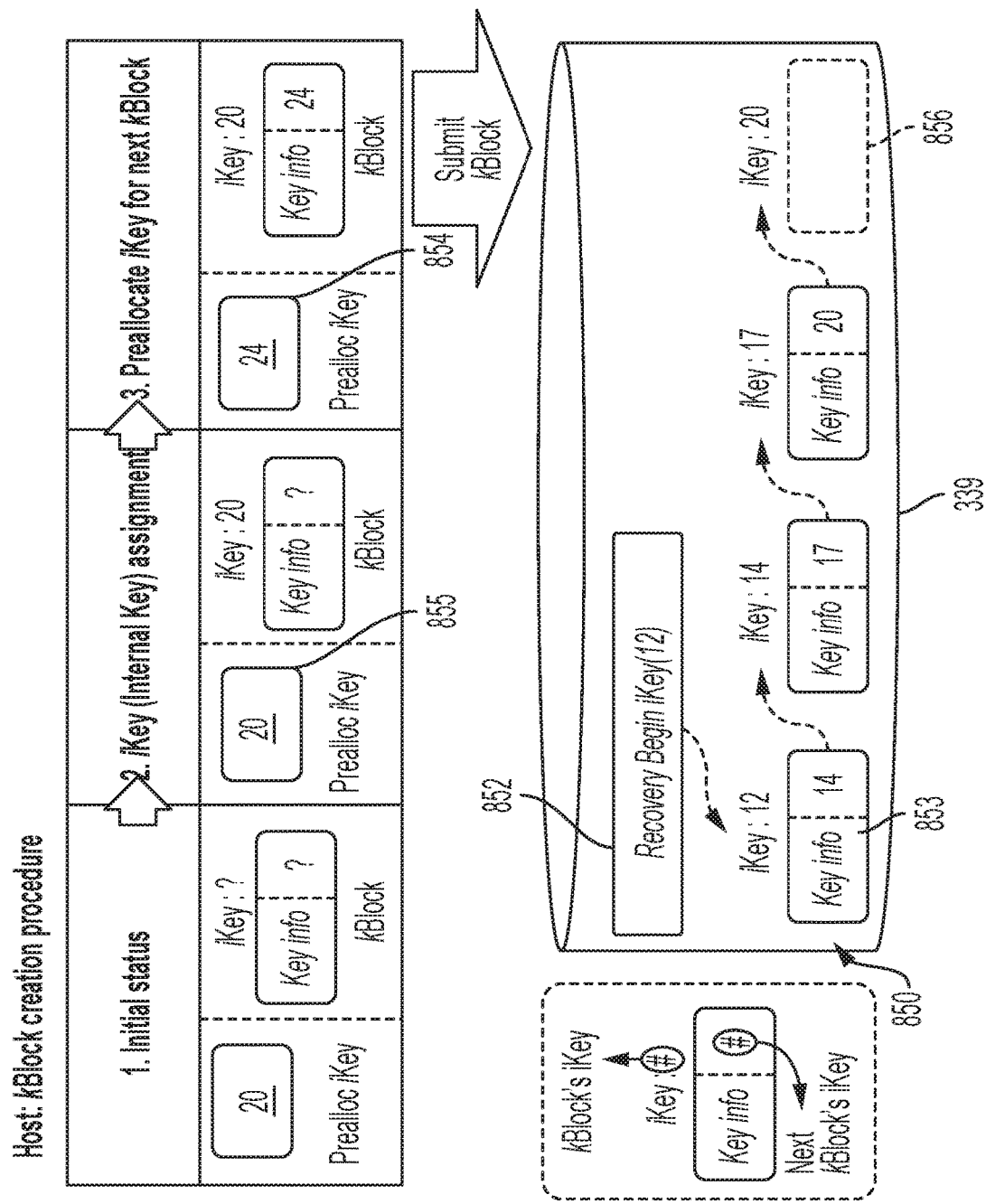
FIG. 8. is a block diagram depicting a mechanism for linking key blocks in a chain to ensure data consistency according to some embodiments of the present disclosure.

FIG. 8 is a block diagram depicting a mechanism for linking kBlocks in a chain to ensure data consistency according to some embodiments of the present disclosure.

Referring to FIG. 8, a WAL (e.g., the WAL 114 of FIG. 1) may be used to ensure data consistency in a KV store (e.g., the first KV store 110 of FIG. 1). However, the WAL 114 may cause a redundant write operation (e.g., a double write), which may cause I/O traffic to double. Moreover, when a file system (e.g., the file system 116 of FIG. 1) uses a journal to ensure file system consistency, a KV pair may be written to the device (e.g., the storage device 119 of FIG. 1) four times. Accordingly, not only is overall performance sacrificed to ensure data consistency, but a WAF may be increased as well, thereby reducing the lifespan of a corresponding SSD. Accordingly, some embodiments of the present disclosure may provide a consistency model that omits the WAL 114 (e.g., may ensure data consistency without the use of a WAL).

To eliminate redundant write operations, some embodiments of the present disclosure provide a method of linking kBlocks 350 in a kBlock chain to ensure data consistency by using the characteristic of the KVSSD 339 with computational storage. The KVSSD 339 may store a single KV pair atomically. Accordingly, by linking the kBlocks 350 to each other, all kBlocks 350 that are not recorded in the SKTable 341 may be traversed during a recovery operation. The kBlock 350 may be created at the host side, and may be submitted to the KVSSD 339.

According to some embodiments of the present disclosure, a transaction rollback operation may be supported without in-place updates in the KVSSD 339. Therefore, all write, update, and delete requests may be added to the end of the kBlock chain 850 as a new kBlock 350.

To create a kBlock chain 850, a new kBlock 350 may use a preallocated iKey 855, which was stored in a previous kBlock as the iKey of the previous kBlock. Then, the new kBlock 350 may have a new preallocated iKey 854 that is preallocated for a subsequent/next kBlock 350, and the new iKey 854 may be stored in the kBlock 350.

Meanwhile, it may be useful to indicate a first/begin kBlock 853 to enable recovery operations. Accordingly, a recovery begin iKey 852 of the begin kBlock 853 may be recorded in the KVSSD 339. The recovery begin iKey 852 may be updated when all keys 352 in the begin kBlock 853 are stored in corresponding SKTables 341. The recovery begin iKey 852 may be updated after all "dirty" SKTables 341 (e.g., SKTables 341 that cannot be confirmed as containing valid data) are updated, thereby avoiding frequent updates of the recovery begin iKey 852.

When a kBlock 350 may be within a recovery range, which is from the recovery begin kBlock 853 to a last kBlock 856 of the kBlock chain 850, the kBlock 350 may be protected from deletion even when the kBlock 350 lacks any valid keys 352, thereby ensuring that the kBlock chain 850 is maintained. In other words, according to some embodiments of the present disclosure, the system may delete only kBlocks 350 that are outside of the recovery range.

Figure 9:
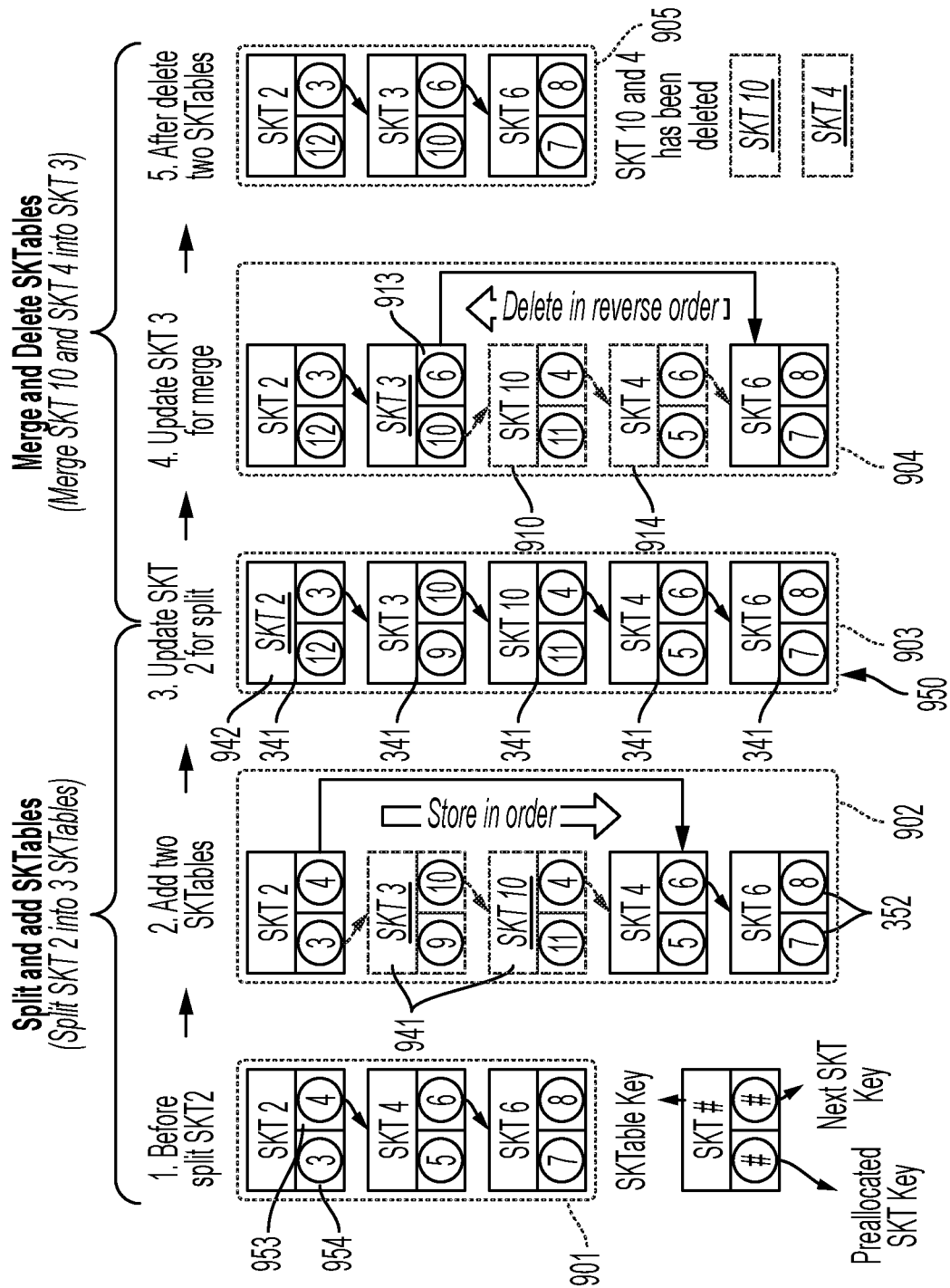
FIG. 9 is a block diagram depicting a mechanism for linking sorted key tables in a chain for ensuring data consistency according to some embodiments of the present disclosure.

FIG. 9 is a block diagram depicting a mechanism for linking SKTables in a chain for ensuring data consistency according to some embodiments of the present disclosure.

Referring to FIG. 9, an SKTable chain mechanism may be used to ensure data consistency. As mentioned above, the SKTable 341 may manage respective user keys 352 within a key range corresponding to the SKTable 341. Accordingly, when a user key 352 is added to, or deleted from, the key range, the SKTable 341 may be updated in the device.

When the size of the SKTable 341 exceeds a reference size (e.g., a maximum SKTable size) following the addition of user keys 352, the SKTable 341 may be split into two or more SKTables 341 (e.g., into one main-SKTable 942 and one or more sub-SKTables 943) Accordingly, the sub-SKTables 943 may be inserted to the SKTable chain 950.

As shown in FIG. 9, operations 901, 902, and 903 depict a method for inserting SKTables 941 into the SKTable chain 950. Each SKTable 341 may have two additional keys 352. One key may be next SKTable key 953, and another key may be a preallocated SKTable key 954, which may be used for the key of first sub-SKTable.

Accordingly, when a crash occurs during an operation for splitting the SKTable 341, the sub-SKTables 943 may be found using the preallocated SKTable key 954. The next SKTable key 953 of a last SKTable of the SKTable chain 950 may be the same as that of the original SKTable, thereby completing the SKTable chain 950.

When all sub-SKTables 943 are successfully stored in the device (e.g., the KVSSD 339 of FIG. 3), the original SKTable may be updated with a reduced corresponding key range. The original SKTable key 954 need not be changed when replacing the next SKTable key 953 with the preallocated SKTable key 954, or when allocating a new SKTable key for the preallocated SKTable key 954. Accordingly, when a data crash or power failure occurs before updating the original SKTable 341, all sub-SKTables 943 may be deleted, and an operation for splitting the SKTable may be started from an initial step. The newly added key may be found in the kBlock chain 850.

Contrastingly, when one or more SKTables 341 have no key 352, or have a small number of keys 352, the SKTables 341 may be merged to the previous SKTable 341. As shown in FIG. 9, operations 903, 904, and 905 show a method of merging and deleting SKTables 341 from the SKTable chain 950. In the example shown in FIG. 9, SKTable "SKT 10" 910 and SKTable "SKT 4" 914 are merged into SKTable "SKT 3" 913. "SKT 3" 913 may be updated before deleting the "SKT 10" 910 and "SKT 4" 914 to avoid breaking the kBlock chain 850.

The next SKTable key 953 of "SKT 3" 913 may be updated to be the next SKTable key 953 of the "SKT 4," which may correspond to the last SKTable in the SKTable chain 950. Then, a preallocated SKTable key 954 of "SKT 3" 913 may be that of "SKT 10" 910, which may be the next SKTable for "SKT 3" 913. Accordingly, when a crash occurs during a merge operation, "SKT 10" 910 and "SKT 3" 913 may be found from the preallocated SKTable key 954, and may be deleted during the recovery operation. To keep the link between SKTables 341 that are candidates for being deleted, the delete operation should be performed in reverse order such that earlier SKTables 341 are deleted last. Therefore, in the present example, "SKT 4" 914 may be deleted first, and thereafter "SKT 10" 910 may be deleted.

Figure 10:
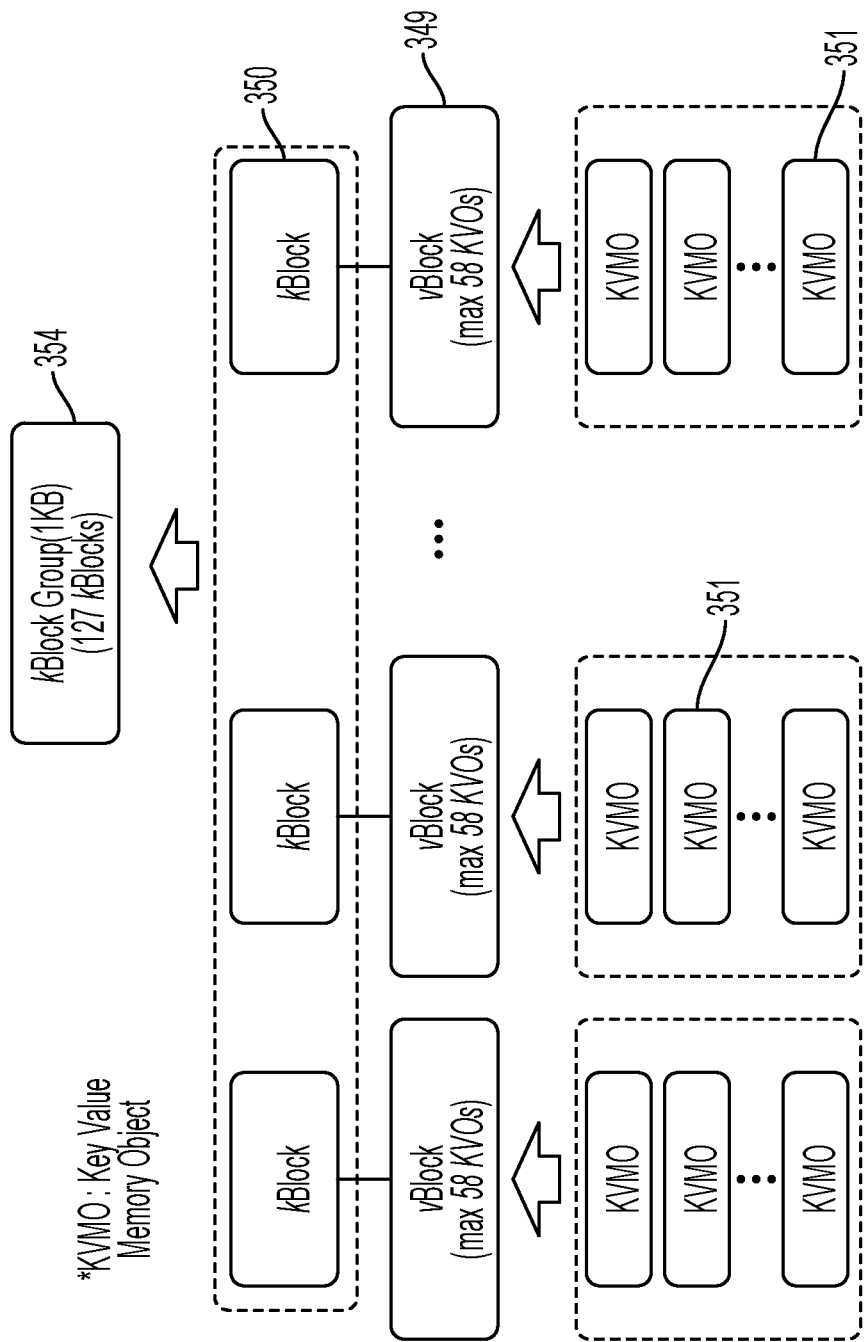
FIG. 10 is a block diagram depicting a relationship of a KV memory object, a value block, a key block, and a key block group according to some embodiments of the present disclosure.

FIG. 10 is a block diagram depicting a relationship of a KVMO, a vBlock, a kBlock, and a kBlock group according to some embodiments of the present disclosure.

Referring to FIG. 10, the CSKVS 330 may be implemented by using objects for managing KV pairs. Different objects may be used for managing the KV pairs and the corresponding relationships between the KV pairs, as described below.

The first object may be one or more KVMOs 351. The KVMO 351 may be created in the user context. The KVMO 351 may be packed along with the vBlock 349 and the kBlock 350 during a write operation of a write thread. The vBlock 349 may pack values 612, and the kBlock 350 may pack keys 352 and other attributes. The kBlock 350 may be deleted when the transaction is committed, and the key information may be recorded in the SKTable 341, and may be merged into the kBlock group 354 including the number of keys 352 and a valid key bitmap (a key bitmap is disclosed in further detail with respect to FIG. 14 below).

Figure 11:
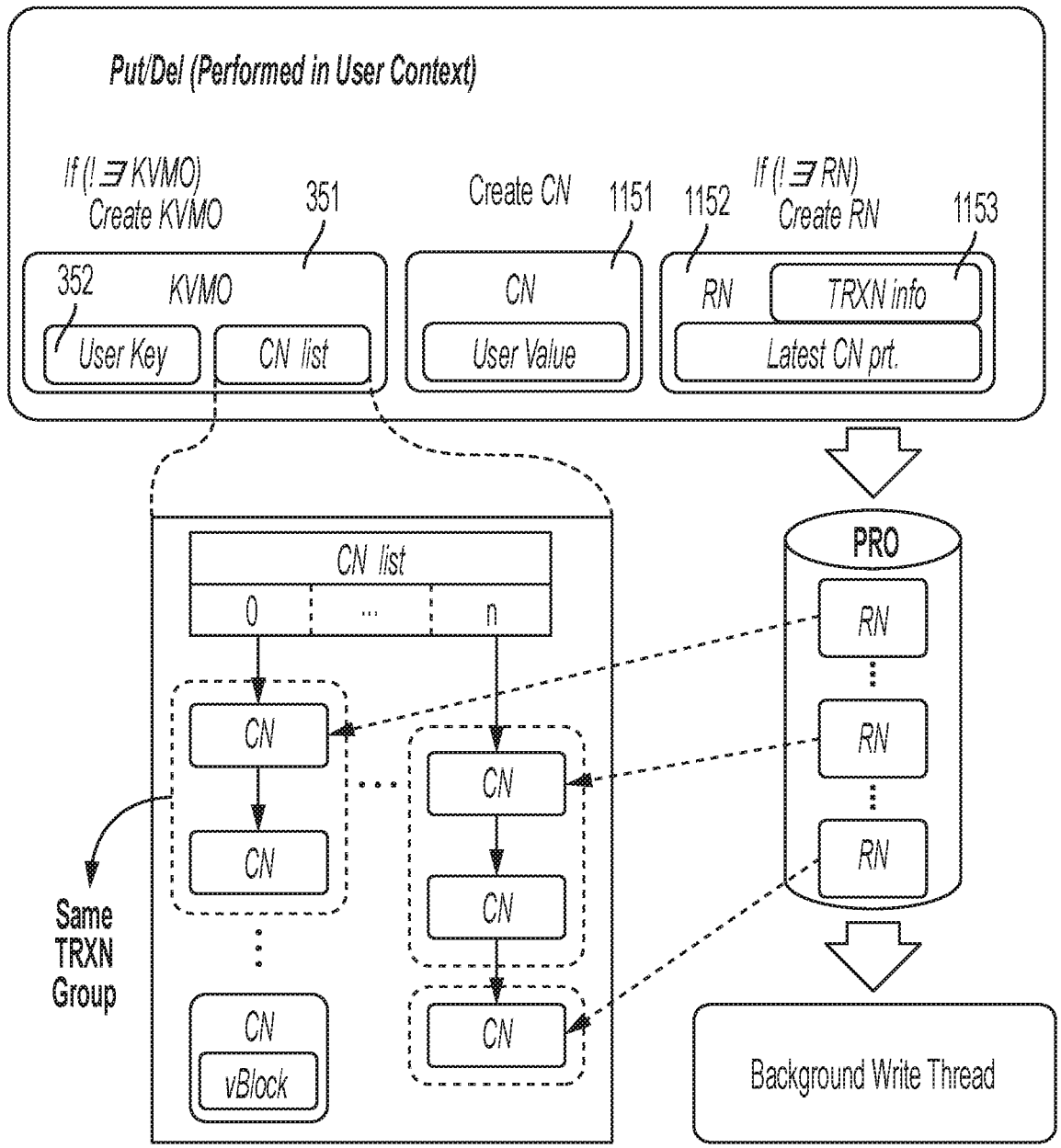
FIG. 11. Is a block diagram depicting a KV memory object, a column node, and a request node according to some embodiments of the present disclosure.
Figure 12:
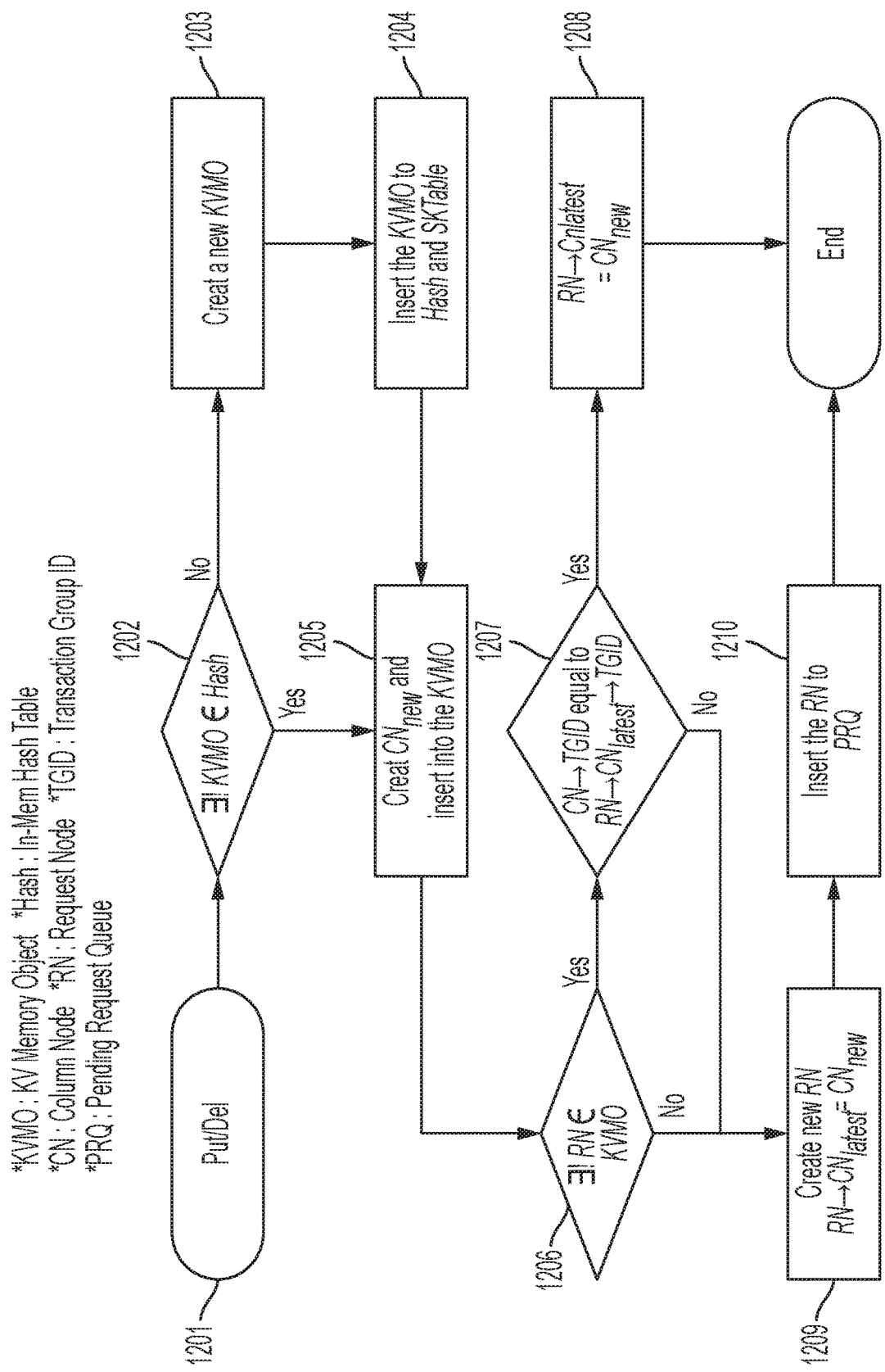
FIG. 12 is a flow chart depicting a put/delete operation according to some embodiments of the present disclosure.

FIG. 11 is a block diagram depicting a KVMO, a column node, and a request node according to some embodiments of the present disclosure. FIG. 12 is a flow chart depicting a put/delete operation according to some embodiments of the present disclosure.

Referring to FIG. 11, the KVMO 351, the column node (CN) 1151, and the request node (RN) 1152 are memory objects for submitting requests to the KVSSD 339. The KVMO 351 may be created for each key 352, while the CN 1151 may be created for each user request. In other words, a KVMO 351 may have multiple columns, and each column may have multiple CNs 1151. Furthermore, the RN 1152 may be created for a common column with the same transaction group ID (TGID) in a key 352, the TGID being found in the transaction information 1153.

Referring to FIG. 12, when a user application sends a put command or a delete command at 1201, the HKVS 340 may first determine whether the KVMO 351 is in the hash at 1202.

When it is determined at 1202 that the KVMO 351 exists, it may be used for the user request. Otherwise, a new KVMO 351 may be created at 1203, and the KVMO 351 may be inserted into the hash and SKTable 341 at 1204.

Then, a new CN 1151 may be created and inserted into the KVMO 351 at 1205. Then it may be determined whether a previous CN 1151 exists at 1206, and whether the previous CN 1151 has the same TGID at 1207, which may be calculated by right shift of transaction ID. The number of bits for shift may be configurable. Transactions may be grouped to allow in-place updates. When it is determined at 1207 that the previous CN 1151 has the same TGID, the new CN 1151 may be inserted to the RN 1152 to merge with the previous CN 1151 at 1208. The merge may be achieved by changing the latest CN 1151 pointer of the RN 1152 to the new CN 1151.

Otherwise, a new RN 1152 may be created at 1209 and inserted into a pending request queue (e.g., the PRQ 342 of FIG. 3) at 1210.

Figure 13:
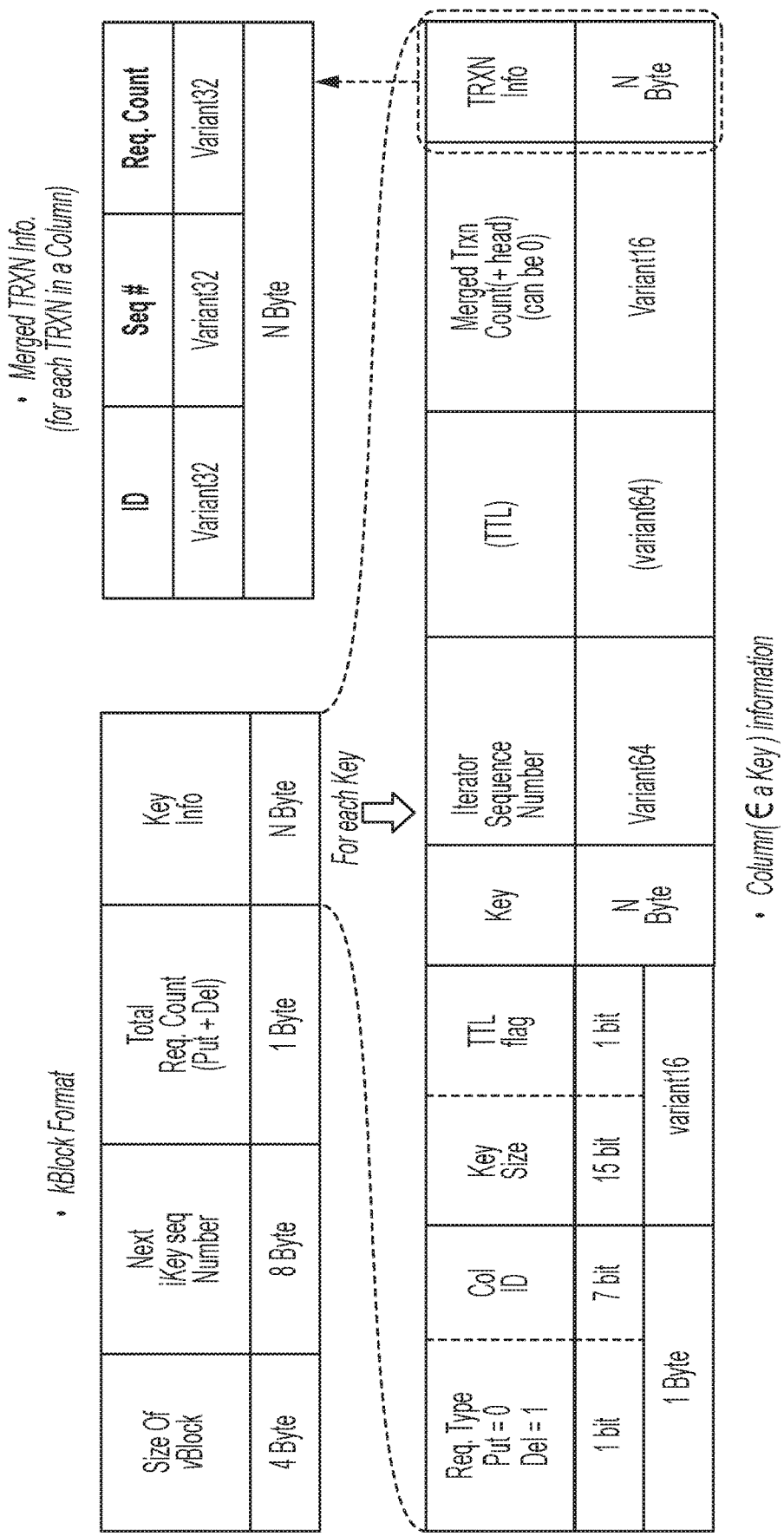
FIG. 13 is a block diagram depicting a key block format according to some embodiments of the present disclosure.

FIG. 13 is a block diagram depicting a kBlock format according to some embodiments of the present disclosure.

Referring to FIG. 13, as mentioned before, in a process of packing KV pairs, user keys 352 and values 612 may be respectively packed in the kBlock 350 and in the vBlock 349. In packing the KV pairs, a write thread may have multiple RNs 1152 from the PRQ 342. In each RN 1152, a most recent CN 1151 may be used for the vBlock 349. The remaining CNs 1151 are considered as in-place updated. However, when the remaining CNs 1151 are part of the transaction, the transaction information for commit and rollback operations may be recorded in the kBlock 350.

After the vBlock 349 is submitted, the iKey of the vBlock 349 (e.g., iKey 413 of FIG. 4), the size of the vBlock 349, and the index of the value offset in the vBlock 349 are stored in the CN 1151 to record the information to the SKTable 341. The user value pointer of the CN 1151 may be also replaced by a vBlock 349 pointer, thereby freeing the user value.

The kBlock 350 may store value attributes (e.g., user key, column ID, sequence number, transaction information, etc.). The information may be used for a recovery process. The vBlock 349, however, may not include any information for delete requests. Accordingly, only the kBlock 350 may have the information about a delete request.

Each chunk of column information may have multiple columns that are updated by a latest CN before submission. When merged columns are part of a transaction, the transaction information may be stored in the kBlock 350 for recovery. When a crash occurs before writing of the kBlock 350 is completed, all of the transactions belonging to the kBlock 350 may be treated as uncommitted transactions.

Figure 14:
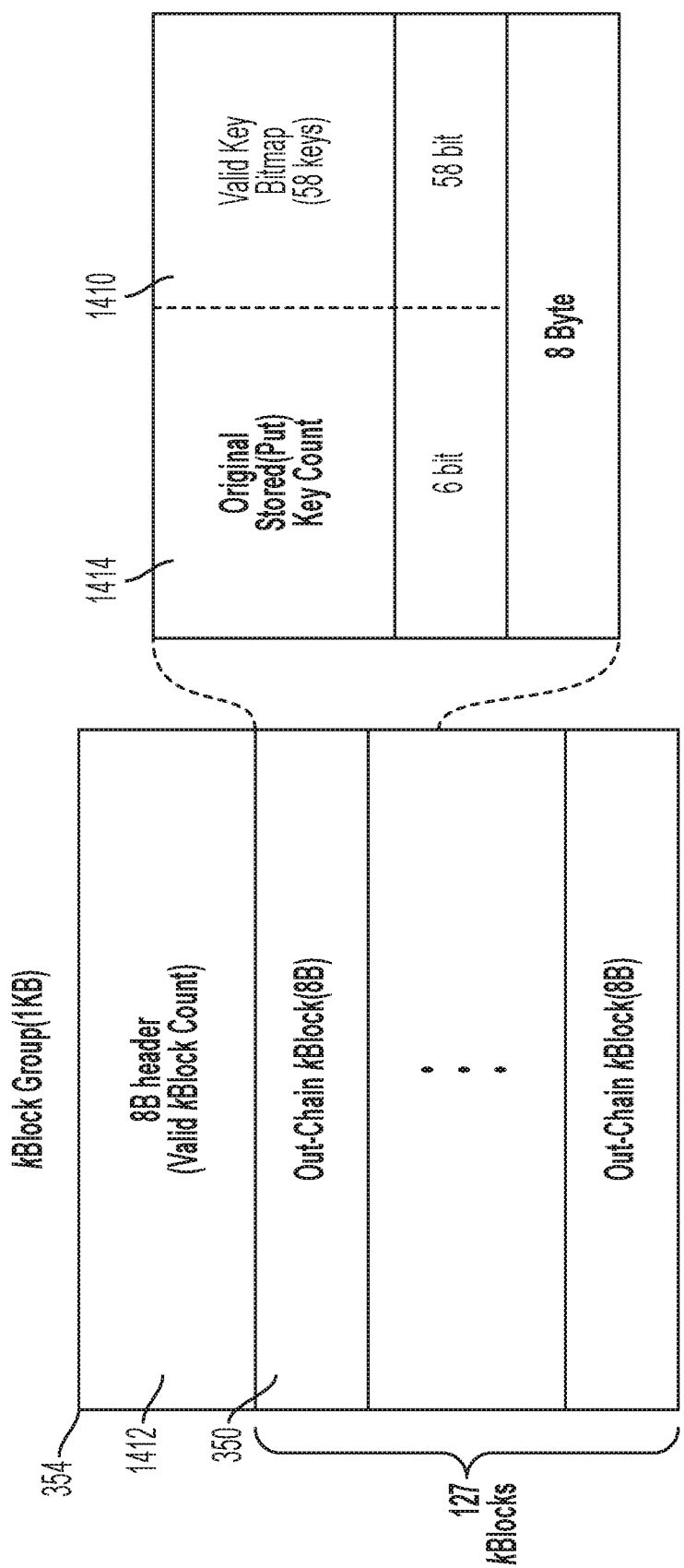
FIG. 14. Is a block diagram depicting a key block group format according to some embodiments of the present disclosure.

FIG. 14 is a block diagram depicting a kBlock group format according to some embodiments of the present disclosure.

Referring to FIG. 14, a kBlock 350 may be deleted after all keys 352 belonging to the kBlock 350 have been recorded in a corresponding SKTable 341. However, it may be useful to keep a bitmap 1410 to indicate which values in the vBlock 349 are valid or invalid.

However, the bitmap 1410 may use as few as eight bytes per kBlock 350. Therefore, 127 kBlocks 350 may be merged into a kBlock group 354 to reduce a number of I/Os. The kBlock group 354 may have an 8-byte header 1412 for determining whether the kBlock group 354 may be deleted.

Each kBlock 350 entry may use eight bytes for both an original key count 1414 and a valid key bitmap 1410. The original number of keys 352 may be used to trigger garbage collection. For example, a garbage collection operation may be triggered with the key of the vBlock 349 and the bitmap 1410 when a number of valid keys 352 is different from the original number of keys 352 indicated by the original key count 1414. For example, the garbage collection operation may be performed when half of the values in a vBlock 349 are invalid.

Figure 15:
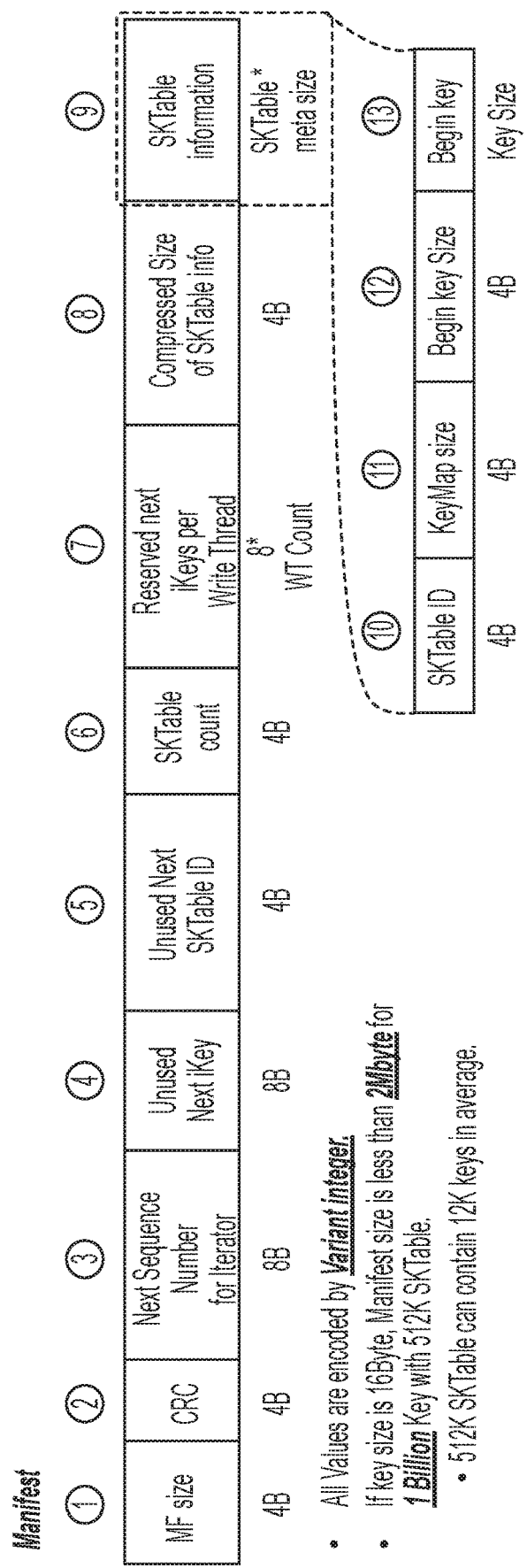
FIG. 15 is a block diagram depicting a manifest format.

FIG. 15 is a block diagram depicting a manifest format.

Referring to FIG. 15, keys 352 may be managed by using an SKTable 341 and a manifest. As discussed above, the SKTable 341 may be a key table for managing a respective key range wherein the user keys 352 are stored in sorted form. The HKVS 340 may manage the SKTables 341 with a skiplist. When the database is closed, the SKTable metadata, which may include the key 352 of the SKTable 341 and a begin user key (e.g., the recovery begin iKey 852), may be stored in the manifest. When the database is opened, the SKTable metadata may be read from the manifest to construct the SKTable skiplist.

In the present example, fields 3, 4, and 5 represent unused numbers, or numbers that have not been used yet. For example, field 4 may represent an iKey that has not yet been used for the vBlock 349 and the kBlock 350. That is, a new preallocated iKey (e.g., the new preallocated iKey 854 of FIG. 8) may start at a number that is recorded in field 4.

In field 7, iKeys may be reserved for next iKeys. That is, these values may be stored in the vBlock chain info after a database is opened, and recovery may begin from the corresponding iKey when a crash occurs. Accordingly, a manifest of 2 MB or less may be created for as many as one billion keys 352.

Figure 16:
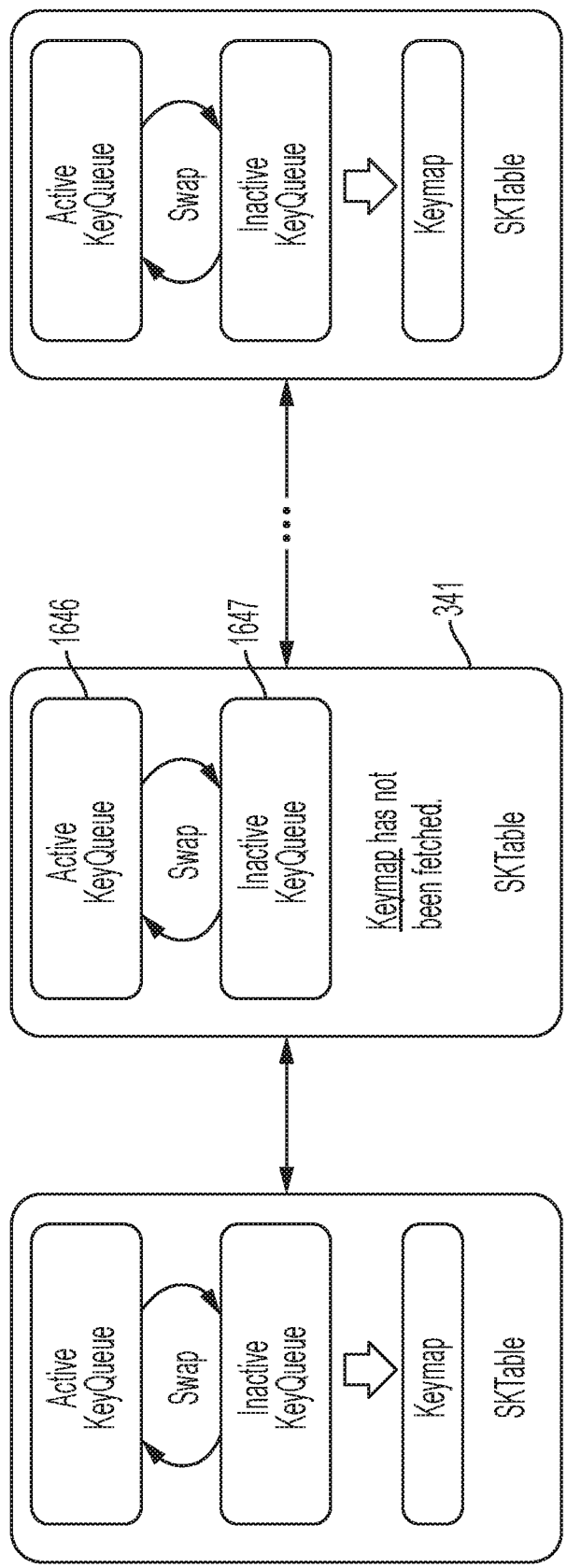
FIG. 16 is a block diagram depicting a key queue format according to some embodiments of the present disclosure.

FIG. 16 is a block diagram depicting a key queue format according to some embodiments of the present disclosure.

Referring to FIG. 16, an SKTable 341 may include three major parts including a KeyQueue 345, a keymap 348, and a DeltaTable. The KeyQueue 345 may receive a new key from a user in unsorted form. The keymap 348 may fetch the key from KeyQueue 345, and may store the keys 352 in sorted form. Further, the DeltaTable may store only new keys 352 to avoid redundant writes.

The KeyQueue 345 may have KVMOs 351, which are not stored in SKTable 341 (e.g., in the keymap 348), in chronological order. In the present example, the KeyQueue 345 may include an active KeyQueue 1646 and an inactive KeyQueue 1647. When the SKTable 341 is flushed (e.g., written to the device and then deleted from memory), the operation may cause the active KeyQueue 1646 and the inactive KeyQueue 1647 to be swapped, and the KVMOs 351 may be recorded in the inactive KeyQueue 1647 in the keymap 348.

Then, the keymap 348 may temporarily have a pointer corresponding to the KVMO instead of the key information for requests that have not been submitted and instead of the transaction that has not been committed. These keys 352 may be managed separately in the SKTable 341, and when a next SKTable 341 is written to the device and deleted, the keys 352 may be preferentially processed before fetching keys 352 from the KeyQueue 345. When the KeyQueue 345 has keys 352 belonging to the Iterator, the iterator may flush the KeyQueue 345 to the keymap 348, as an iterator operation may be performed using sorted keys 352.

Figure 17A:
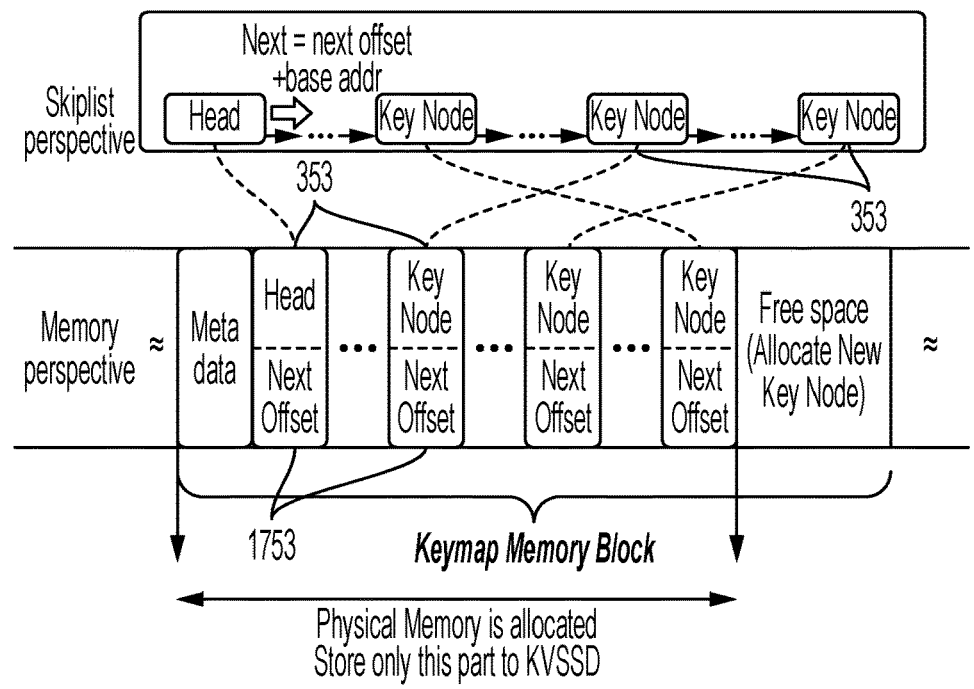
FIGS. 17A and 17B are block diagrams depicting a keymap structure, and a key node format corresponding to the keymap structure, according to some embodiments of the present disclosure.

FIG. 17A is a block diagram depicting a keymap structure according to some embodiments of the present disclosure.

FIG. 17A shows a skiplist and a keymap memory block corresponding to the keymap structure. The keymap 348 may manage keys 352 with a skiplist. Each key node 353 may be allocated within a corresponding memory block to store the keymap 348 (skiplist) to the KVSSD 339 without conversion.

To point to the next key node 353, each key node 353 may have an offset from a base address instead of having the next key node 353 address. Therefore, the position of the next key node 353 may be calculated as a sum of the next offset 1753 and the base address. Accordingly, the skiplist need not depend on the virtual address. In other words, the address of the next node in the skiplist may be dynamically calculated even when a different virtual address is assigned during reloading of the keymap 348 from the KVSSD 339.

On the other hand, to store the keymap 348 "as is" to the KVSSD 339, each key node 353 of the skiplist may be located in a continuous virtual memory. Therefore, memory for a key node 353 may be allocated within a memory block, which may be 2 MB in size. When storing the keymap 348 to the KVSSD 339, the memory block may be stored between the base address to the end of the used memory. When the used memory size exceeds the default size, the size of the memory block may be adjusted through a reallocation operation, or a new SKTable 341 may be created while the keymap 348 is split.

When the keymap 348 is split, key nodes 353 may be sequentially inserted into a new memory block, and invalidated key nodes 353 may be removed. Because the keymap 348 allows in-place updating, invalid key nodes 353 may be created only due to a delete operation. Also, invalid key nodes 353 in a memory block may be reused for new key nodes 353.

Additionally, when all of the keys 352 in the keymap 348 are deleted, the keys 352 may be merged into the previous keymap 348. A merge operation may be performed between adjacent SKTables 341, and the keys 352 may be merged even when the SKTable 341 is not empty for efficiency of SKTable 341 management.

Figure 17B:
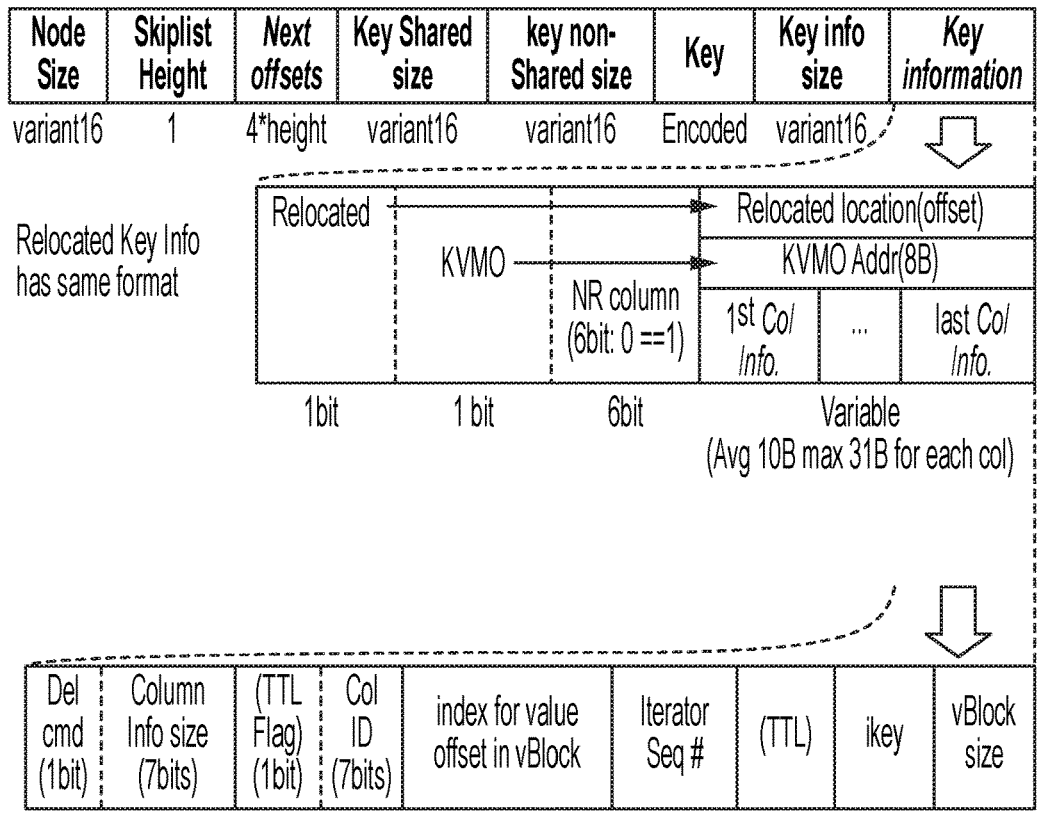

FIG. 17B is a block diagram depicting a key node format corresponding to the keymap structure according to some embodiments of the present disclosure. Each key node 353 may include an offset for the next key node 353 in the skiplist, user key information, and column information. The column information may include vBlock information. In the user key information, a "relocated" field and a KVMO may refer to the following.

With respect to the relocated field, while updating the key node 353, when the existing key node 353 size is smaller than a newly requested memory size, new memory for column info may be allocated, and the offset may be recorded in the relocated location.

With respect to the KVMO field, when a vBlock 349 has not been submitted to the KVSSD 339, or when a transaction to which the column belongs is not committed, a pointer to the KVMO 351 may be stored instead of inserting column information. Accordingly, the key node 353 need not be inserted into the DeltaTable.

With respect to the DeltaTable, whenever a new key 352 is inserted to the keymap 348, when an entirety of the keymap 348 is able to be stored in the KVSSD 339, duplicate information may be repeatedly written to the KVSSD 339. For example, when the keymap 348 has a size of 512 KB, even if only a few bytes of the keymap 348 are changed, 512 KB of data should be written to the KVSSD 339. In this case, there may be not only an increase in I/O traffic, but WAF may increase as well.

Accordingly, the DeltaTable may be employed to avoid rewriting any key node 353 that was not updated. The DeltaTable may be a set of new key nodes 353 where the vBlock 349 may be submitted and the transaction may be completed. That is, when key nodes 353 are inserted into the keymap 348 in memory, the key nodes 353 also may be inserted into the DeltaTable.

After that, the DeltaTable, and not the keymap 348, may be stored to the KVSSD 339. The ID of the DeltaTable may include an SKTable ID and a Delta table ID (e.g., sequence number). The modified keymap 348 may be stored to the KVSSD 339 when evicting the SKTable 341 or when closing the DB.

After storing the keymap 348, the DeltaTables may be deleted from the KVSSD 339. The ID range of DeltaTables to be deleted may be stored in the metadata area of the keymap 348 to enable a recovery operation following a crash. The next DeltaTable ID may start from the next sequence number of the last DeltaTable ID.

Figure 18:
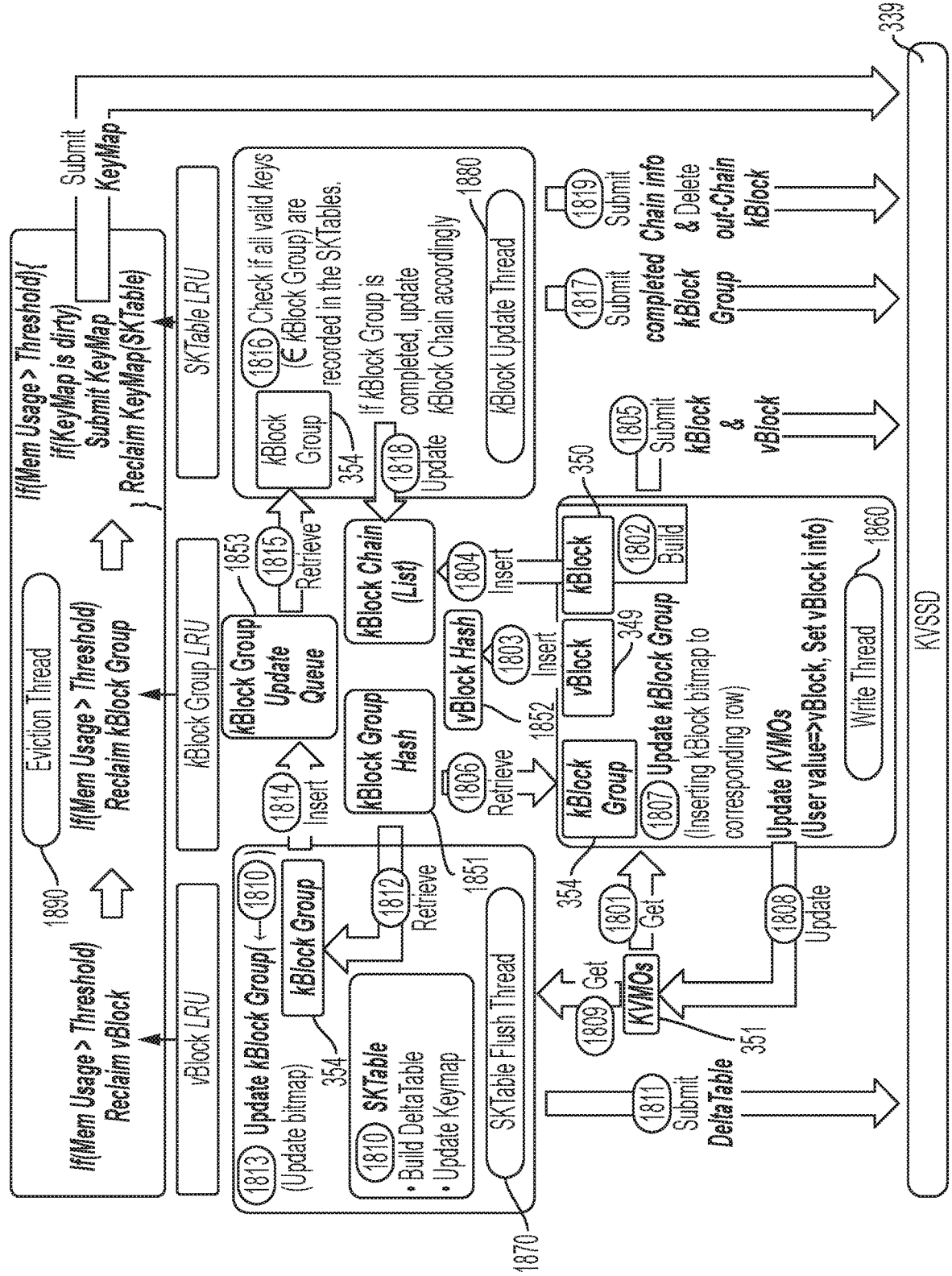
FIG. 18 is a flow chart depicting different background threads and their relationships according to some embodiments of the present disclosure.

FIG. 18 is a flow chart depicting different background threads and their relationships according to some embodiments of the present disclosure.

Referring to FIG. 18, the HKVS 340 may have four types of background threads. For example, the background threads may include a worker thread 1860, a SKTable flush thread 1870, a vBMG update thread 1880, and an eviction thread 1890. Each type of background thread may have a unique role, and may be linked through data structures. The operations 1801 to 1819 may indicate a processing flow for a put/del command, for example.

With respect to a worker thread (e.g., a write thread) 1860, the HKVS 340 may have multiple write threads. Each write thread may pack multiple KVMOs 351 into a vBlock 349 and a kBlock 350 to reduce the total number of device submissions to the KVSSD 339, and may write the KVMOs 351 to the KVSSD 339 at operations 1801 and 1802.

To avoid rewriting the entire vBlock 349 to record the updated information, metadata related to the key 352 may be separately recorded in the kBlock 350. A write thread may get an iKey from an iKey generator. The vBlock 349 and the kBlock 350 may share the iKey, and may be distinguished by a key type field (e.g., a field for the key type 412 of FIG. 4). When the iKey is reserved for a kBlock group 354, the kBlock group 354 may be created using the iKey, and the kBlock group 354 may be inserted to a kBlock group 354 hash table 1851.

After that, another iKey may be retrieved from the iKey generator. When the vBlock 349 and the kBlock 350 are created, the vBlock 349 and the kBlock 350 may be respectively inserted into the vBlock hash 1852 and the kBlock chain 850, and may be submitted to the device at operations 1803, 1804, and 1805.

After that, a corresponding kBlock group 354 may be fetched from the kBlock group hash 1851 and may be updated.

Then, the user value of the related KVMO 351 may be replaced by using the vBlock 349 at operations 1806, 1804, and 1808. On the other hand, when kBlocks 350 are simultaneously submitted from respective write threads, the order in which the kBlocks 350 are written may be not guaranteed, and the kBlock chain 850 may be broken. Accordingly, the kBlock chain 850 may be created for each write thread.

With respect to a SKTable flush thread 1870 (e.g., a flush thread wherein the SKTable 341 is written to the KVSSD 339 and then deleted), the SKTable flush thread 1870 may be responsible for recording the DeltaTable to the KVSSD 339 when the keymap 348 is changed. In the present example, the keys 352 in the KeyQueue 345 may be inserted into the keymap 348, and a DeltaTable may be created at operations 1809 and 1810

As mentioned above, to reduce the overhead that is associated with rewriting an entirety of the keymap 348 when the number of newly inserted keys 352 is small, only newly inserted keys 352 are collected separately in the DeltaTable, which may be then stored in the KVSSD 339 at operation 1811.

When the keymap 348 is updated, the kBlock group 354 for the key 352 recorded in the keymap 348 also may be updated at operations 1812 and 1813.

For example, the SKTable flush thread 1870 may clear the corresponding bit in the bitmap (e.g., the bitmap 1410 of FIG. 14) of the kBlock group 354 to which the old key 352 belongs. For the new key 352, the kBlock's KVMO count, which may exist only in memory, may be decreased. When the KVMO count reaches zero, the kBlock group 354 may be submitted to the KVSSD 339, and the kBlock 350 belonging to the kBlock group 354 may be deleted. The kBlock group 354 then may be inserted into the kBlock group update queue 1853 to deliver the updated kBlock group 354 to the update thread 1880 at operation 1814.

When the SKTable flush thread 1870 updates one kBlock group 354 in multiple SKTables 341, the kBlock group 354 may be inserted multiple times, while the last request may be the only request that is processed in the kBlock update thread 1880.

With respect to the vBMG update thread (e.g., a kBlock update thread) 1880, the kBlock update thread 1880 may write or overwrite the updated kBlock group 354 to the KVSSD 339. The kBlock update thread 1880 also may update the begin kBlock information of the kBlock chain 850, and may delete out-of-chain kBlocks 350. For example, the kBlock update thread 1880 may first fetch the kBlock group 354 from the kBlock group update queue 1853 at operation 1816

When all of the keys 352 in the kBlock 350 have been recorded in corresponding SKTables 341, the kBlock 350 may be submitted to the KVSSD 339 at operation 1817. Then, the kBlock chain 850 may be updated accordingly. When the range of the kBlock chain 850 is changed, the kBlocks 350 that are out of the kBlock chain 850 (e.g., out-of-chain kBlocks) may be deleted from the KVSSD 339 at operations 1818 and 1819.

Before deleting the kBlocks 350, the begin key information (e.g., of the recovery begin iKey 852) of the updated kBlock chain 850 and the key 352 of the kBlock 350 may be recorded into the kBlock chain 850 record to prevent corruption from a crash, thereby ensuring data consistency.

Meanwhile, keys 352 in a kBlock group 354 may belong to different SKTables 341, and multiple keys 352 may be updated within a given period. Therefore, the kBlock update thread 1880 may delay updating the kBlock group 354 to avoid overwriting the kBlock group 354 multiple times. However, when the kBlock group update operation takes too long, or when the kBlock group update operation may be considered late, a length of the kBlock chain 850 may be long. Accordingly, periodic maintenance may be potentially warranted.

With respect to the eviction thread 1890, the eviction thread 1890 may evict the vBlock 349, the kBlock group 354, and the keymap 348 when cache memory is insufficient. Each object may be managed by a least-recently-used policy (LRU), and may be evicted according to priority. That is, the vBlock 349 or the kBlock group 354 may be evicted initially. However, when there is still insufficient memory even after the eviction of the vBlock 349 and/or the kBlock group, the keymaps 348 may be evicted. Accordingly, the key information may be evicted conservatively. When the keymap 348, which may be an eviction candidate, has been updated, the thread may write the keymap 348 to the KVSSD 339.

It should be noted that the metadata table format may be as follows. As discussed above, the metadata table may be located in memory. There may be a key map for each metadata table, and a corresponding key map may be for an updated key. The key map may include a tree, or skiplist, including multiple keys, each key corresponding to a list including key info, which may include value info, a sequence number, and user-key-to-device key mapping info. However, when there is no key update, the key map may be empty. Further, when a metadata table has not been fetched, the metadata does not have a device format table. The metadata table device format according to embodiments of the present disclosure can be built from a conventional metadata table device format and the key map, and can thereby be submitted to the storage device.

Accordingly, embodiments of the present disclosure provide a high-performance KV store architecture for a KV device capable of advanced functionality, efficient KV management, and WAF reduction, while omitting a file system, thereby omitting any need for KV-to-file translation, while also omitting a WAL that is conventionally used for crash recovery.

While embodiments of the present disclosure have been particularly shown and described with reference to the accompanying drawings, the specific terms used herein are only for the purpose of describing the invention and are not intended to define the meanings thereof or be limiting of the scope of the invention set forth in the claims. Therefore, those skilled in the art will understand that various modifications and other equivalent embodiments of the present disclosure are possible. Consequently, the true technical protective scope of the present disclosure must be determined based on the technical spirit of the appended claims, with functional equivalents thereof to be included therein.

What is claimed is:

1. A method of data storage, the method comprising:
receiving a write request including a user key;
determining the user key exists in a cache;
generating or updating metadata corresponding to the user key responsive to the determining the user key exists in the cache;
writing data corresponding to the write request to a storage device;
converting the metadata to a device format corresponding to the storage device based on a metadata table device format and a key map of a metadata table; and
storing the metadata on the storage device.

2. The method of claim 1, wherein determining the user key exists in the cache comprises:
determining the metadata table, to which the user key belongs, exists; and
determining the metadata has the user key.

3. The method of claim 1, wherein generating or updating the metadata corresponding to the user key comprises:
generating the metadata to replace metadata that is absent from the cache; or
updating the metadata that exists in the cache.

4. The method of claim 3, wherein generating the metadata comprises:
sending a prefetch request to prefetch the metadata; and
adding the metadata to the cache.

5. The method of claim 3, wherein updating the metadata comprises:
creating the user key;
inserting the user key into the key map of the metadata table; and
adding key information to the metadata table.

6. The method of claim 1, wherein converting the metadata to the device format corresponding to the storage device comprises:
processing requests on pending request queue; and
building the device format.

7. The method of claim 1, further comprising:
retrieving the metadata table from the cache;
determining the metadata is missing from memory;
loading the metadata table from a prefetch buffer or from the storage device;
determining the user key is found in the key map;
adding key information to a key list; and
submitting the metadata to the storage device.

8. A key-value (KV) store for storing data to a storage device, the KV store being configured to:
receive a write request including a user key;
determine the user key exists in a cache;
generate or update metadata corresponding to the user key responsive to determining the user key exists in the cache;
write data corresponding to the write request to the storage device;
convert the metadata to a device format corresponding to the storage device based on a metadata table device format and a key map of a metadata table; and
store the metadata on the storage device.

9. The KV store of claim 8, wherein the KV store is configured to determine the user key exists in the cache by:
determining the metadata table, to which the user key belongs, exists; and
determining the metadata has the user key.

10. The KV store of claim 8, wherein the KV store is configured to generate or update the metadata corresponding to the user key by:
generating the metadata to replace metadata that is absent from the cache; or
updating the metadata that exists in the cache.

11. The KV store of claim 10, wherein the KV store is configured to generate the metadata by:
sending a prefetch request to prefetch the metadata; and
adding the metadata to the cache.

12. The KV store of claim 10, wherein the KV store is configured to update the metadata by:
creating the user key;
inserting the user key into the key map of the metadata table; and
adding key information to the metadata table.

13. The KV store of claim 8, wherein the KV store is configured to convert the metadata to the device format corresponding to the storage device by:
processing requests on pending request queue; and
building the device format.

14. The KV store of claim 8, wherein the KV store is further configured to:
retrieve the metadata table from the cache;
determine the metadata is missing from memory;
load the metadata table from a prefetch buffer or from the storage device;
determine the user key is found in the key map;
add key information to a key list; and
submit the metadata to the storage device.

15. A non-transitory computer readable medium implemented with a key-value (KV) store for storing data to a storage device, the non-transitory computer readable medium having computer code that implements a method of data storage, the method comprising:
receiving a write request including a user key;
determining the user key exists in a cache;
generating or updating metadata corresponding to the user key responsive to the determining the user key exists in the cache;
writing data corresponding to the write request to the storage device;
converting the metadata to a device format corresponding to the storage device based on a metadata table device format and a key map of a metadata table; and
storing the metadata on the storage device.

16. The non-transitory computer readable medium of claim 15, wherein determining the user key exists in the cache comprises:
   determining the metadata table, to which the user key belongs, exists; and
   determining the metadata has the user key.

17. The non-transitory computer readable medium of claim 15, wherein generating or updating the metadata corresponding to the user key comprises:
   generating the metadata to replace metadata that is absent from the cache; or
   updating the metadata that exists in the cache.

18. The non-transitory computer readable medium of claim 17, wherein generating the metadata comprises:
   sending a prefetch request to prefetch the metadata; and
   adding the metadata to the cache.

19. The non-transitory computer readable medium of claim 17, wherein updating the metadata comprises:
   creating the user key;
   inserting the user key into the key map of the metadata table; and
   adding key information to the metadata table.

20. The non-transitory computer readable medium of claim 15, wherein converting the metadata to the device format corresponding to the storage device comprises:
   processing requests on pending request queue; and
   building the device format.

\* \* \* \* \*